(12) United States Patent
Sasaki et al.

(10) Patent No.: US 7,308,753 B2
(45) Date of Patent: Dec. 18, 2007

(54) METHOD OF MANUFACTURING SLIDER OF THIN-FILM MAGNETIC HEAD

(75) Inventors: Yoshitaka Sasaki, Milpitas, CA (US); Takehiro Kamigama, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 334 days.

(21) Appl. No.: 11/063,837

(22) Filed: Feb. 23, 2005

(65) Prior Publication Data

US 2005/0138795 A1 Jun. 30, 2005

Related U.S. Application Data

(62) Division of application No. 10/011,780, filed on Dec. 11, 2001, now Pat. No. 6,882,505.

(51) Int. Cl.
*G11B 5/127* (2006.01)
(52) U.S. Cl. ............... 29/603.12; 29/603.15; 29/603.16; 29/603.18; 216/22; 216/52
(58) Field of Classification Search ............ 29/603.07, 29/603.12, 603.15, 603.16, 603.18; 216/22, 216/38, 52; 360/236.6, 235.8
See application file for complete search history.

(56) References Cited

U.S. PATENT DOCUMENTS

| 4,802,042 | A | 1/1989 | Strom | |
|---|---|---|---|---|
| 5,271,802 | A | * 12/1993 | Chang et al. | 216/22 |
| 5,299,079 | A | 3/1994 | Kuroda | |
| 5,335,126 | A | 8/1994 | Tokyuama et al. | |
| 5,663,853 | A | 9/1997 | Park | |
| 5,835,305 | A | 11/1998 | Hamaguchi et al. | |
| 6,181,519 | B1 | 1/2001 | Kim | |
| 6,216,529 | B1 | 4/2001 | Burga et al. | |
| 6,470,565 | B1 | 10/2002 | Sasaki | |
| 6,589,436 | B1 * | 7/2003 | Tabib et al. | 216/52 X |
| 6,934,124 | B2 | 8/2005 | Sasaki et al. | |

FOREIGN PATENT DOCUMENTS

| JP | 59-142776 | * | 8/1984 |
|---|---|---|---|
| JP | A-63-42018 | | 2/1988 |
| JP | A-1-128281 | | 5/1989 |

(Continued)

*Primary Examiner*—A. Dexter Tugbang
(74) *Attorney, Agent, or Firm*—Oliff & Berridge, PLC

(57) ABSTRACT

A slider comprises a slider body and a head element. The slider body has an air bearing surface, an air inflow end and an air outflow end. The air bearing surface has: a first surface including two portions extending in a direction of air passage; a second surface including a portion disposed between the two portions of the first surface; and a third surface located closer to the air outflow end than the first surface is. The first surface and the second surface have such a difference in level that the second surface is located farther from a recording medium than the first surface is. The difference in level varies gradually so as to increase with decreasing distance from the air outflow end. A method of manufacturing the slider includes forming a slider material containing a portion to be the slider body and the head element, and processing the material so as to form the air bearing surface.

2 Claims, 25 Drawing Sheets

FOREIGN PATENT DOCUMENTS

| | | |
|---|---|---|
| JP | B-3-30229 | 4/1991 |
| JP | A-7-161023 | 6/1995 |
| JP | A-7-161024 | 6/1995 |
| JP | 08045220 A | 2/1996 |
| JP | A 9-63027 | 3/1997 |
| JP | B2-2712090 | 10/1997 |
| JP | A 11-185418 | 7/1999 |
| JP | A 2000-3570 | 1/2000 |
| JP | A 2000-215429 | 8/2000 |
| JP | B2-3158487 | 2/2001 |
| JP | A-2001-250214 | 9/2001 |

* cited by examiner

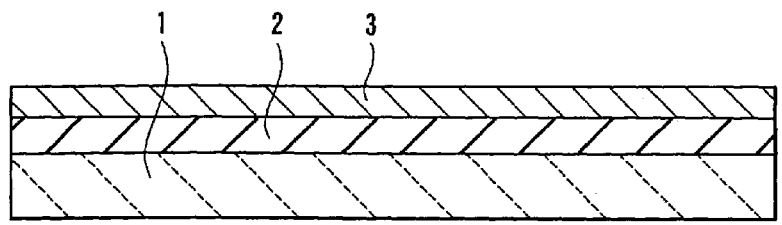 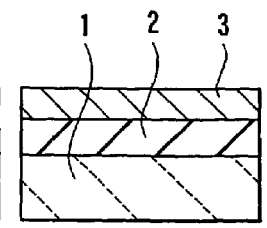
FIG. 3A   FIG. 3B
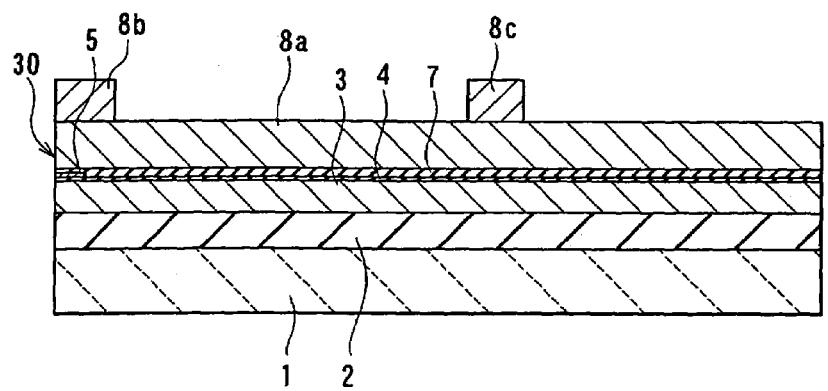 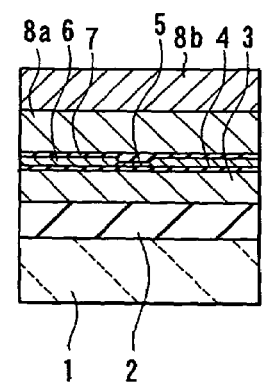
FIG. 4A   FIG. 4B

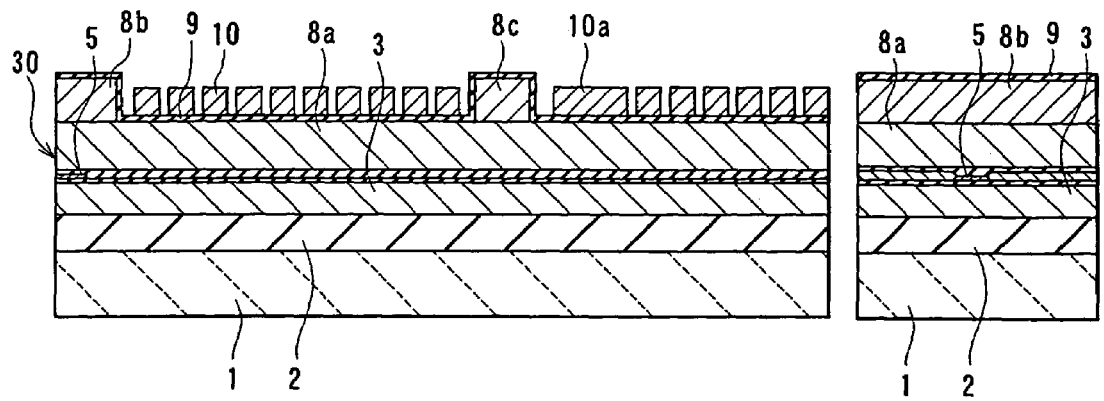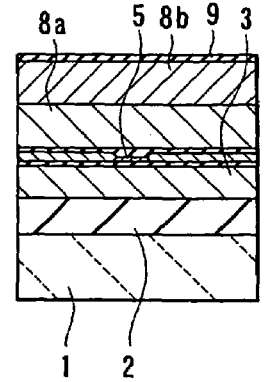
FIG. 5A  FIG. 5B
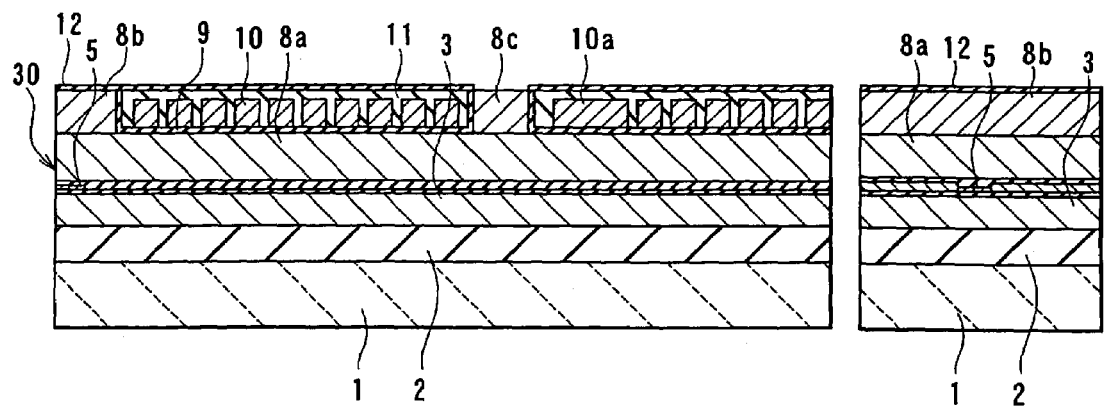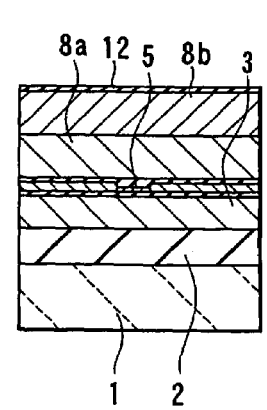
FIG. 6A  FIG. 6B

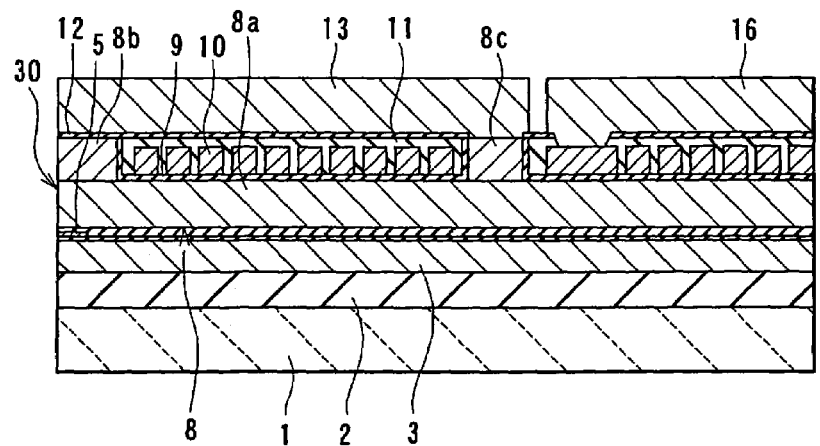
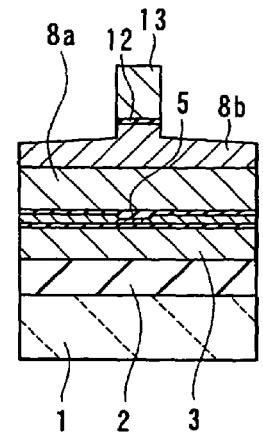
FIG. 7A
FIG. 7B
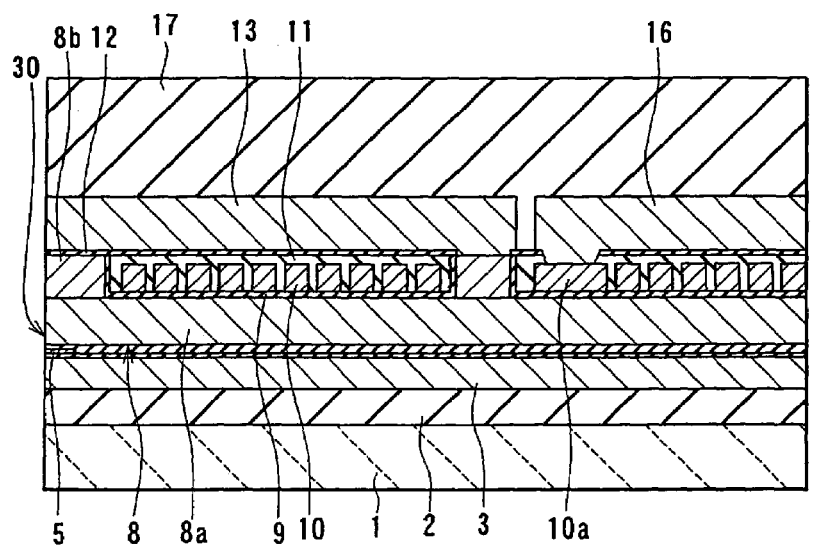
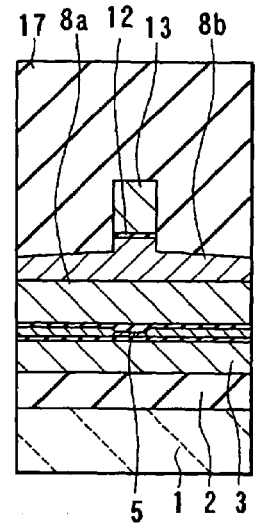
FIG. 8A
FIG. 8B

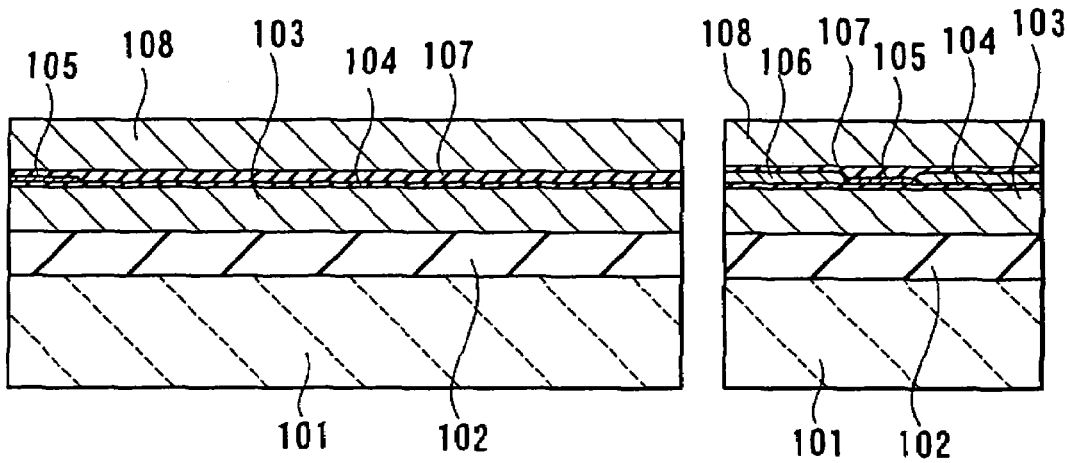
FIG. 32A
RELATED ART
FIG. 32B
RELATED ART
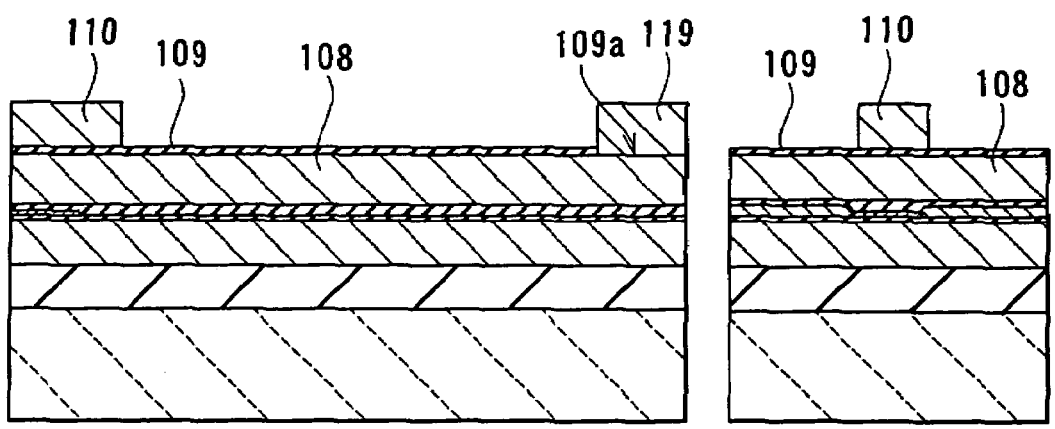
FIG. 33A
RELATED ART
FIG. 33B
RELATED ART

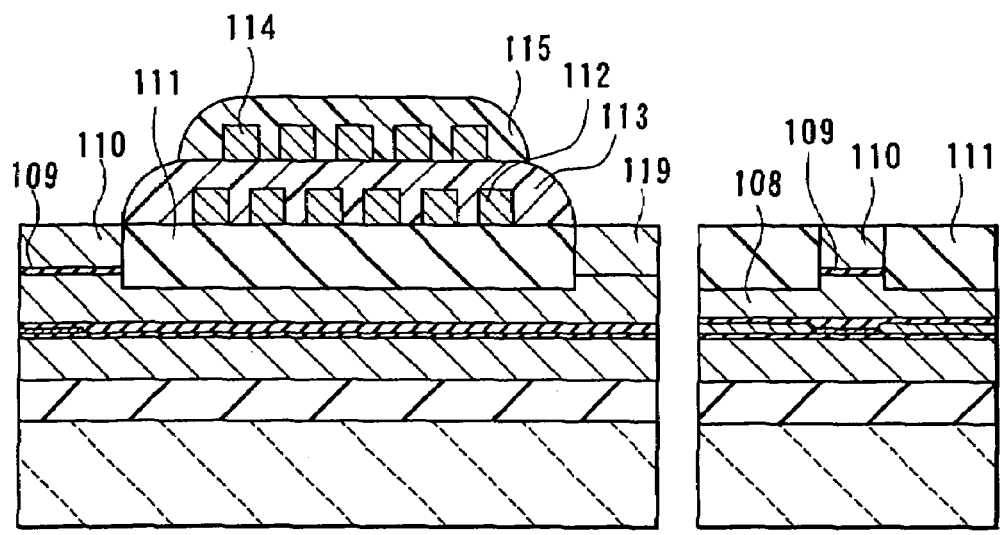
FIG. 34A
RELATED ART
FIG. 34B
RELATED ART
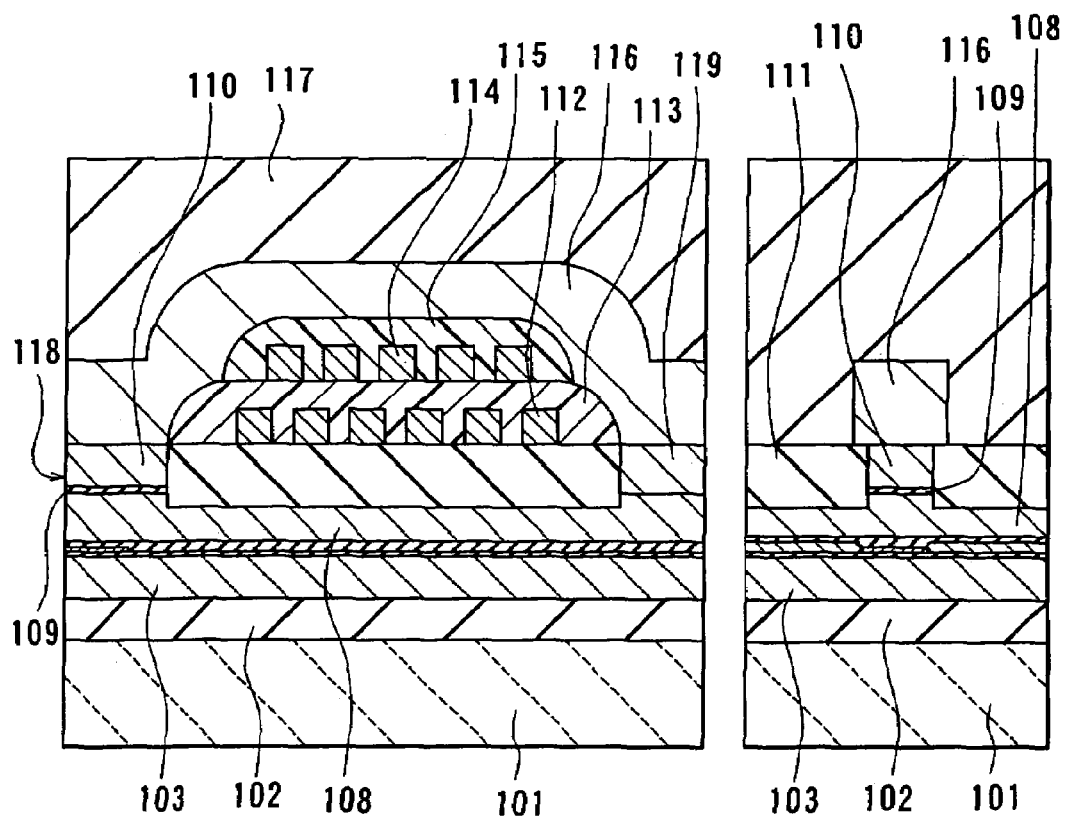
FIG. 35A
RELATED ART
FIG. 35B
RELATED ART

METHOD OF MANUFACTURING SLIDER OF THIN-FILM MAGNETIC HEAD

PRIORITY

This is a Divisional of application Ser. No. 10/011,780 filed Dec. 11, 2001 now U.S. Pat. No. 6,882,505. The entire disclosure of the prior application is hereby incorporated by reference herein.

BACKGROUND

The present invention relates to a slider of a thin-film magnetic head which comprises a medium facing surface that faces toward a recording medium and a thin-film magnetic head element located near the medium facing surface, and to a method of manufacturing such a slider.

Performance improvements in thin-film magnetic heads have been sought as areal recording density of hard disk drives has increased. Such thin-film magnetic heads include composite thin-film magnetic heads that have been widely used. A composite head is made of a layered structure including a recording head having an induction-type electromagnetic transducer for writing and a reproducing head having a magnetoresistive element (that may be hereinafter called an MR element) for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head where areal recording density is more than 1 gigabit per square inch. A GMR head is used as a reproducing head where areal recording density is more than 3 gigabits per square inch. It is GMR heads that have been most widely used recently.

Performance of the reproducing head is improved by replacing the AMR film with a GMR film and the like having an excellent magnetoresistive sensitivity. Alternatively, a pattern width such as the reproducing track width and the MR height, in particular, may be optimized. The MR height is the length (height) between an end of the MR element located in the air bearing surface and the other end. The air bearing surface is a surface of the thin-film magnetic head facing toward a magnetic recording medium.

Performance improvements in a recording head are also required as the performance of a reproducing head is improved. It is required to increase the recording track density in order to increase the areal recording density among the performance characteristics of the recording head. To achieve this, it is required to implement a recording head of a narrow track structure wherein the width of top and bottom poles sandwiching the recording gap layer on a side of the air bearing surface is reduced down to microns or a submicron order. Semiconductor process techniques are utilized to implement such a structure. A pattern width, such as the throat height in particular, is also a factor that determines the recording head performance. The throat height is the length (height) of pole portions, that is, portions of magnetic pole layers facing each other with a recording gap layer in between, between the air-bearing-surface-side end and the other end. To achieve improvement in the recording head performance, it is desirable to reduce the throat height. The throat height is controlled by an amount of lapping when the air bearing surface is processed.

As thus described, it is important to fabricate well-balanced recording and reproducing heads to improve the performance of the thin-film magnetic head.

In order to implement a thin-film magnetic head that achieves high recording density, the requirements for the reproducing head include a reduction in reproducing track width, an increase in reproducing output, and a reduction in noise. The requirements for the recording head include a reduction in recording track width, an improvement in overwrite property that is a parameter indicating one of characteristics when data is written over existing data, and an improvement in nonlinear transition shift.

In general, a flying-type thin-film magnetic head used in a hard disk drive and the like is made up of a slider having a thin-film magnetic head element formed at the trailing edge thereof. The slider slightly flies over a recording medium by means of airflow generated by the rotation of the medium.

Reference is now made to FIGS. 32A to 35A, FIGS. 32B to 35B, and FIG. 36 to describe an example of a method of manufacturing a related-art thin-film magnetic head element. FIGS. 32A to 35A are cross sections each orthogonal to the air bearing surface. FIGS. 32B to 35B are cross sections of the pole portion each parallel to the air bearing surface.

According to the manufacturing method, as shown in FIGS. 32A and 32B, an insulating layer 102 made of alumina ($Al_2O_3$), for example, is deposited to a thickness of about 5 to 10 μm on a substrate 101 made of aluminum oxide and titanium carbide ($Al_2O_3$—TiC), for example. Next, on the insulating layer 102, a bottom shield layer 103 made of a magnetic material is formed for a reproducing head.

On the bottom shield layer 103, a bottom shield gap film 104 made of an insulating material such as alumina is formed to a thickness of 100 to 200 nm, for example, through a technique such as sputtering. On the bottom shield gap film 104, an MR element 105 for reproduction is formed to a thickness of tens of nanometers. Next, a pair of electrode layers 106 are formed to be electrically connected to the MR element 105 on the bottom shield gap film 104.

Next, a top shield gap film 107 made of an insulating material such as alumina is formed through sputtering, for example, on the bottom shield gap film 104, the MR element 105 and the electrode layers 106. The MR element 105 is embedded in the shield gap films 104 and 107.

Next, on the top shield gap film 107, a top-shield-layer-cum-bottom-pole layer (called a bottom pole layer in the following description) 108 having a thickness of about 3 μm is formed. The bottom pole layer 108 is made of a magnetic material and used for both the reproducing head and the recording head.

Next, as shown in FIGS. 33A and 33B, a recording gap layer 109 made of an insulating film such as an alumina film and having a thickness of 0.2 μm is formed on the bottom pole layer 108. Next, the recording gap layer 109 is partially etched to form a contact hole 109a for making a magnetic path. Next, a top pole tip 110 for the recording head is formed on the recording gap layer 109 in the pole portion. The top pole tip 110 is made of a magnetic material and has a thickness of 0.5 to 1.0 μm. At the same time, a magnetic layer 119 made of a magnetic material is formed for making the magnetic path in the contact hole 109a for making the magnetic path.

Next, as shown in FIGS. 34A and 34B, the recording gap layer 109 and the bottom pole layer 108 are etched through ion milling, using the top pole tip 110 as a mask. As shown in FIG. 34B, the structure is called a trim structure wherein the sidewalls of the top pole portion (the top pole tip 110), the recording gap layer 109, and a part of the bottom pole layer 108 are formed vertically in a self-aligned manner.

Next, an insulating layer 111 of alumina, for example, having a thickness of about 3 μm, is formed over the entire surface. The insulating layer 111 is polished to the surfaces of the top pole tip 110 and the magnetic layer 119 and flattened.

On the flattened insulating layer 111 a first layer 112 of a thin-film coil, made of copper (Cu), for example, is formed for the induction-type recording head. Next, a photoresist layer 113 is formed into a specific shape on the insulating layer 111 and the first layer 112 of the coil. Heat treatment is performed at a specific temperature to flatten the surface of the photoresist layer 113. Next, a second layer 114 of the thin-film coil is formed on the photoresist layer 113. Next, a photoresist layer 115 is formed into a specific shape on the photoresist layer 113 and the second layer 114 of the coil. Heat treatment is performed at a specific temperature to flatten the surface of the photoresist layer 115.

Next, as shown in FIGS. 35A and 35B, a top pole layer 116 for the recording head is formed on the top pole tip 110, the photoresist layers 113 and 115 and the magnetic layer 119. The top pole layer 116 is made of a magnetic material such as Permalloy (NiFe). Next, an overcoat layer 117 of alumina, for example, is formed to cover the top pole layer 116. Finally, machine processing of the slider including the forgoing layers is performed to form the air bearing surface 118 of the recording head and the reproducing head. The thin-film magnetic head element is thus completed.

FIG. 36 is a top view of the thin-film magnetic head element shown in FIGS. 35A and 35B. The overcoat layer 117 and the other insulating layers and films are omitted in FIG. 36.

Reference is now made to FIGS. 37 to 42 to describe the configuration and functions of a related-art slider. FIG. 37 is a bottom view showing an example of the configuration of the air bearing surface of the related-art slider. FIG. 38 is a perspective view of the related-art slider. In the example shown in FIGS. 37 and 38, the air bearing surface of the slider 120 is shaped such that the slider 120 slightly flies over the surface of a recording medium such as a magnetic disk by means of airflow generated by the rotation of the recording medium. In this example, a thin-film magnetic head element 122 is disposed at a position near the air outflow end of the slider 120 (the end on the upper side of FIG. 37) and near the air bearing surface thereof. The configuration of the thin-film magnetic head element 122 is as shown in FIGS. 35A and 35B, for example. Portion A of FIG. 37 corresponds to FIG. 35B.

In the example shown in FIGS. 37 and 38, the air bearing surface of the slider 120 has first surfaces 121a that are closest to the recording medium, a second surface 121b having a first difference in level from the first surfaces 121a, and a third surface 121c having a second difference in level, greater than the first difference in level, from the first surfaces 121a. The first surfaces 121a are disposed near both sides along the width of the slider 120 (the lateral direction in FIG. 37) and around the thin-film magnetic head element 122. The second surface 121b is disposed near the air inflow end (the end on the lower side of FIG. 37). The remaining part of the air bearing surface, i.e., the part other than the first and second surfaces 121a and 121b, constitutes the third surface 121c. The first difference in level between the first and second surfaces 121a and 121b is about 1 μm. The second difference in level between the first and third surfaces 121a and 121c is about 2 to 3 μm.

While the recording medium is rotating, a pressure is created between the recording medium and the first surfaces 121a of the air bearing surface of the slider 120 shown in FIGS. 37 and 38, the pressure moving the slider 120 away from the recording medium. In the air bearing surface of the slider 120 shown in FIGS. 37 and 38, the second surface 121b is disposed near the air inflow end, and the third surface 121c is disposed closer to the air outflow end than the second surface 121b is. Here, while the recording medium is rotating, the air passing through between the second surface 121b and the recording medium increases in volume when it reaches the space between the third surface 121c and the recording medium. Accordingly, a negative pressure to draw the slider 120 toward the recording medium is generated between the third surface 121c and the recording medium. As a result, while the recording medium is rotating, the slider 120 flies over the recording medium, being inclined such that the air outflow end is closer to the recording medium than the air inflow end is. The inclination of the air bearing surface of the slider 120 with respect to the surface of the recording medium is designed to fall within 1°, for example. The amount of flying of the slider 120 can be reduced by appropriately designing the shape of the air bearing surface.

The slider 120 is fabricated as follows. First, a wafer that includes a plurality of rows of portions to be sliders (hereinafter called slider portions), each of the slider portions including the thin-film magnetic head element 122, is cut in one direction to form blocks called bars each of which includes a row of slider portions. The surface of this bar to be the air bearing surface is then lapped into a lapped surface. Then, first photoresist masks are formed by photolithography on a portion of this lapped surface, the portion being to be the first surfaces 121a. Using the first photoresist masks, the lapped surface is selectively etched to form a stepped surface that has the first difference in level from the lapped surface. The first photoresist masks are then removed. Then, a second photoresist mask is formed by photolithography on the portion of the lapped surface that is to be the first surfaces 121a and on a portion of the stepped surface, the portion being to be the second surface 121b. Using this second photoresist mask, the stepped surface is selectively etched to form the third surface 121c having the second difference in level from the lapped surface. In this way, the first surfaces 121a, the second surface 121b, and the third surface 121c are formed. Then, the bar is cut into the individual sliders 120.

FIG. 39 is a cross section illustrating the slider 120 and a recording medium 140 in a state in which the recording medium 140 is at rest. In FIG. 39, the slider 120 is shown as sectioned along line 39-39 of FIG. 37. FIG. 40 shows the slider 120 as viewed from the upper side of FIG. 37.

As shown in FIG. 39, the greater part of the slider 120 is made up of the substrate 101 made of aluminum oxide and titanium carbide, for example. The rest of the slider 120 is made up of an insulating portion 127 made of alumina, for example, and the thin-film magnetic head element 122 and so on formed in the insulating portion 127. The greater part of the insulating portion 127 is the overcoat layer 117.

In the slider 120 shown in FIGS. 39 and 40, a protection layer 128, made of diamond-like carbon (DLC) or the like, is formed on the air bearing surface so as to protect the bottom shield layer 103, the bottom pole layer 108, the top pole tip 110, the top pole layer 116 and others from corrosion.

FIG. 41 is a cross section illustrating the slider 120 and the recording medium 140 in a state in which the recording medium 140 has just started rotation from a resting state. FIG. 42 shows a state in which the recording medium 140 is rotating and the slider 120 is flying over the surface of the recording medium 140 to perform reading and writing with the thin-film magnetic head element 122. While the slider 120 is flying, the minimum distance H11 between the slider 120 and the recording medium 140 is about 8 to 10 nm, and the distance H12 between the air outflow end of the slider 120 and the recording medium 140 is about 100 to 500 nm.

Measures for improving the performance of a hard disk drive, such as areal recording density in particular, include increasing a linear recording density and increasing a track density. To design a high-performance hard disk drive, specific measures to be taken for implementing the recording head, the reproducing head or the thin-film magnetic head as a whole differ depending on whether linear recording density or track density is emphasized. That is, if priority is given to track density, a reduction in track width is required for both the recording head and the reproducing head, for example.

If priority is given to linear recording density, it is required for the reproducing head, for example, to improve the reproducing output and to reduce a shield gap length, that is, the distance between the bottom shield layer and the top shield layer. Furthermore, it is required to reduce the distance between the recording medium and the thin-film magnetic head element (hereinafter called a magnetic space).

A reduction in magnetic space is achieved by reducing the amount of flying of the slider. A reduction in magnetic space contributes not only to an improvement in the reproducing output of the reproducing head but also to an improvement in the overwrite property of the recording head.

The amount of flying of the slider can be reduced, for example, by forming the first, second, and third surfaces having differences in level from one another in the air bearing surface of the slider as shown in FIGS. 37 and 38. As described before, however, the formation of the air bearing surface having such a configuration necessitates two steps of forming a photoresist mask and two steps of etching. Accordingly, forming the first through third surfaces of different levels from one another in the air bearing surface of the slider has a problem in that the number of steps for manufacturing the slider is large and the manufacturing costs of the slider is therefore high.

On the other hand, as the magnetic space is reduced, the slider is likely to collide with the recording medium, which can result in damage to the recording medium and the thin-film magnetic head element. To avoid this, it is required to enhance the smoothness of the surface of the medium. However, the slider easily sticks to the medium if the smoothness of the surface of the medium is enhanced. This results in a problem that the slider is harder to take off from the recording medium when the recording medium starts rotation from a resting state where the slider is in contact with the recording medium.

Conventionally, a crown or a camber is formed on the air bearing surface of the slider in order to prevent the slider from sticking to the recording medium. A crown refers to a convex surface which gently curves along the length of the slider 120 as shown in FIG. 39. A camber refers to a convex surface which gently curves along the width of the slider 120 as shown in FIG. 40. The crown has a difference of elevation C1 on the order of 10 to 50 nm. The camber has a difference of elevation C2 on the order of 5 to 20 nm.

Crowns are conventionally formed, for example, by changing the orientation of the bar with respect to the surface plate when lapping the air bearing surface of the bar.

Cambers are conventionally formed by the following method, for example. That is, after lapping the air bearing surface of the bar to adjust MR height, slits are made in the bar, using a diamond grinder or the like, at positions at which the slider portions are to be separated. Then, the air bearing surface of the bar is re-lapped lightly on a concave surface plate.

In the above-described method for forming cambers, after the MR height is precisely adjusted by lapping the air bearing surface of the bar, the air bearing surface of the bar is lapped again by about 10 to 20 nm in order to form the camber. This results in a problem that the MR height can deviate from its desired value. Further, according to this method, when the air bearing surface of the bar is lapped on the concave surface plate, the bar can be scratched by stain and dust on the surface plate, which results in a problem of a lower yield of the thin-film magnetic heads. Further, according to this method, when the air bearing surface of the bar is lapped on the concave surface plate, chippings of the electrode layer connected to the MR element may be jammed and spread between the air bearing surface and the surface plate, producing a defect called a smear. The smear sometimes causes an electric short circuit between the MR element and the shield layers. The short circuit can lower the sensitivity of the reproducing head and produce noise in the reproducing output, thereby deteriorating the performance of the reproducing head.

Further, if crowns/cambers are to be formed on the air bearing surfaces of the sliders, manufacturing costs of the sliders are raised because of the steps of forming the crowns/cambers.

SUMMARY

A first object of the invention is to provide a slider of a thin-film magnetic head that is easy to manufacture and can attain reduction in magnetic space, and a method of manufacturing such a slider.

A second object of the invention is, in addition to the aforementioned first object, to provide a slider of a thin-film magnetic head and a method of manufacturing same, which make it possible to prevent the slider from sticking to the recording medium and to prevent damages to a recording medium or a thin-film magnetic head element due to a collision between the slider and the recording medium.

A slider of a thin-film magnetic head according to the invention comprises:

a slider body having: a medium facing surface that faces toward a rotating recording medium; an air inflow end; and an air outflow end; and a thin-film magnetic head element disposed near the air outflow end and near the medium facing surface of the slider body, wherein:

the medium facing surface has: a first surface including a plurality of portions that extend in a direction of air passage; and a second surface including a portion that extends in the direction of air passage, the portion of the second surface being disposed between the plurality of portions of the first surface, and the first surface and the second surface have such a difference in level that the second surface is located farther from the recording medium than the first surface is, the difference in level varying gradually so as to increase with decreasing distance from the air outflow end.

In the slider of a thin-film magnetic head of the invention, the difference in level between the first and second surfaces varies gradually so as to increase with decreasing distance from the air outflow end. Therefore, while the recording medium is rotating, the air passing through between the second surface and the recording medium gradually increases in volume. As a result, a negative pressure for drawing the slider toward the recording medium occurs between the second surface and the recording medium.

In the slider of a thin-film magnetic head of the invention, the first surface and the second surface may form an angle of 10° or smaller.

In the slider of a thin-film magnetic head of the invention, while the recording medium is rotating, the first surface may slant against the surface of the recording medium such that the smaller the distance between a point in the first surface and the air inflow end, the greater the distance between the point in the first surface and the recording medium. In this case, the first surface and the surface of the recording medium may form an angle of 10° or smaller while the recording medium is rotating.

In the slider of a thin-film magnetic head of the invention, the slider body may be in contact with the surface of the recording medium while the recording medium is at rest, and may stay away from the surface of the recording medium while the recording medium is rotating.

In the slider of a thin-film magnetic head of the invention, the medium facing surface may further have: a third surface that is located closer to the air outflow end than the first surface is; and a border part located between the first surface and the third surface, and the first surface may be slanted against the third surface such that the first and third surfaces altogether make a convex shape bent at the border part. In this case, the first surface and the third surface may form an angle of 10° or smaller.

In the slider of a thin-film magnetic head of the invention, where the medium facing surface has the third surface and the border part, the slider body may be in contact with the surface of the recording medium while the recording medium is at rest, and may stay away from the surface of the recording medium while the recording medium is rotating. In this case, when the slider body comes into contact with the surface of the recording medium, the border part may be the first to make contact with the surface of the recording medium. When the slider body takes off from the surface of the recording medium, the border part may be the last to depart from the surface of the recording medium.

In the slider of a thin-film magnetic head of the invention, where the medium facing surface has the third surface and the border part, regardless of whether the recording medium is rotating or at rest, the slider body may be in contact with the surface of the recording medium at the border part, and the first surface may slant against the surface of the recording medium such that the smaller the distance between a point in the first surface and the air inflow end, the greater the distance between the point in the first surface and the recording medium.

In the slider of a thin-film magnetic head of the invention, where the medium facing surface has the third surface and the border part, the medium facing surface may have a recess formed in a region including the border part.

In the slider of a thin-film magnetic head of the invention, where the medium facing surface has the third surface and the border part, the slider body may include: a substrate portion that has a surface facing toward the recording medium and makes a base of the thin-film magnetic head element; and an insulating portion that has a surface facing toward the recording medium and surrounds the thin-film magnetic head element. In this case, the medium facing surface may have a recess formed in a region including the border part, and the recess may be formed in the substrate portion.

In the slider of a thin-film magnetic head of the invention, where the slider body includes the substrate portion and the insulating portion, the slider body may further include a protection layer that covers the surfaces of the substrate portion and the insulating portion facing toward the recording medium. In this case, the medium facing surface may have a recess formed in a region including the border part, and the recess may be formed in the protection layer. The protection layer may be made of alumina or diamond-like carbon.

In the slider of a thin-film magnetic head of the invention, where the slider body includes the substrate portion and the insulating portion, the surface of the insulating portion facing toward the recording medium may be located farther from the recording medium than a part of the surface of the substrate portion facing toward the recording medium is, the part being adjacent to the surface of the insulating portion facing toward the recording medium. In this case, the slider body may be in contact with the surface of the recording medium regardless of whether the recording medium is rotating or at rest, and a portion of the third surface, the portion belonging to the substrate portion, may be in contact with the surface of the recording medium at least while the recording medium is rotating.

Where the slider body includes the substrate portion and the insulating portion, the length of the portion of the third surface belonging to the substrate portion in the direction of air passage may be equal to or less than 50% the length of the entire substrate portion in the direction of air passage.

A method of the invention is provided for manufacturing a slider of a thin-film magnetic head, the slider comprising: a slider body having a medium facing surface that faces toward a rotating recording medium, an air inflow end, and an air outflow end; and a thin-film magnetic head element disposed near the air outflow end and near the medium facing surface of the slider body, wherein: the medium facing surface has: a first surface including a plurality of portions that extend in a direction of air passage; and a second surface including a portion that extends in the direction of air passage, the portion of the second surface being disposed between the plurality of portions of the first surface, the first surface and the second surface having such a difference in level that the second surface is located farther from the recording medium than the first surface is, the difference in level varying gradually so as to increase with decreasing distance from the air outflow end.

The method comprises the steps of:
forming a slider material containing a portion to be the slider body and the thin-film magnetic head element, and
processing the slider material so as to form the medium facing surface on the slider material, the medium facing surface having the first surface and the second surface.

In the slider of a thin-film magnetic head manufactured by the method of the invention, the difference in level between the first and second surfaces varies gradually so as to increase with decreasing distance from the air outflow end. Therefore, while the recording medium is rotating, the air passing through between the second surface and the recording medium gradually increases in volume. As a result, a negative pressure for drawing the slider toward the recording medium occurs between the second surface and the recording medium.

In the method of manufacturing the slider of the invention, the slider material may have a surface to be the medium facing surface, and the step of processing the slider material may include the steps of: selectively etching the surface to be the medium facing surface of the slider material to form the second surface; and, after the formation of the second surface, lapping the surface to be the medium facing surface of the slider material to form the first surface.

In the method of manufacturing the slider of the invention, the first surface and the second surface may form an angle of 10° or smaller.

In the method of manufacturing the slider of the invention, the medium facing surface further may have: a third surface that is located closer to the air outflow end than the first surface is; and a border part located between the first surface and the third surface, and the first surface may be slanted against the third surface such that the first and third surfaces altogether make a convex shape bent at the border part. In the step of processing the slider material, the slider material may be processed so as to form the medium facing surface on the slider material, the medium facing surface having the first surface, the second surface, the third surface, and the border part.

In the method of manufacturing the slider of the invention, where the medium facing surface has the third surface and the border part, the slider material may have a surface to be the medium facing surface, and the step of processing the slider material may include the steps of: lapping the surface to be the medium facing surface of the slider material to form a lapped surface including the third surface; selectively etching the lapped surface to form the second surface; and, after the formation of the second surface, lapping a part of the lapped surface to form the first surface, the third surface, and the border part.

In the method of manufacturing the slider of the invention, where the medium facing surface has the third surface and the border part, the slider material may have a surface to be the medium facing surface, and the step of processing the slider material may include the steps of: selectively etching the surface to be the medium facing surface of the slider material to form the second surface; after the formation of the second surface, lapping the surface to be the medium facing surface of the slider material to form a lapped surface including the third surface; and lapping a part of the lapped surface to form the first surface, the third surface, and the border part.

In the method of manufacturing the slider of the invention, where the medium facing surface has the third surface and the border part, the first surface and the third surface may form an angle of 10° or smaller.

In the method of manufacturing the slider of the invention, where the medium facing surface has the third surface and the border part, the step of processing the slider material may include the step of forming a recess in the medium facing surface at a region including the border part.

In the method of manufacturing the slider of the invention, where the medium facing surface has the third surface and the border part, the portion to be the slider body may include: a substrate portion that has a surface facing toward the recording medium and makes a base of the thin-film magnetic head element; and an insulating portion that has a surface facing toward the recording medium and surrounds the thin-film magnetic head element. In this case, the step of processing the slider material may include the step of forming a recess in the medium facing surface at a region including the border part by etching the substrate portion.

In the method of manufacturing the slider of the invention, where the slider body includes the substrate portion and the insulating portion, the step of processing the slider material may include the step of forming a protection layer for covering the surfaces of the substrate portion and the insulating portion facing toward the recording medium. In this case, the step of processing the slider material may include the step of forming a recess in the medium facing surface at a region including the border part by etching the protection layer. The protection layer may be made of alumina or diamond-like carbon.

In the method of manufacturing the slider of the invention, where the slider body includes the substrate portion and the insulating portion, the surface of the insulating portion facing toward the recording medium may be located farther from the recording medium than a part of the surface of the substrate portion facing toward the recording medium is, the part being adjacent to the surface of the insulating portion facing toward the recording medium. Furthermore, the length of a portion of the third surface in the direction of air passage, the portion belonging to the substrate portion, may be equal to or less than 50% the length of the entire substrate portion in the direction of air passage.

Other and further objects, features and advantages of the invention will appear more fully from the following description.

BRIEF DESCRIPTION OF THE DRAWINGS

FIGS. 3A and 3B are cross sections for illustrating a step in an example of a method of manufacturing a thin-film magnetic head element.

FIGS. 4A and 4B are cross sections for illustrating a step that follows FIGS. 3A and 3B.

FIGS. 5A and 5B are cross sections for illustrating a step that follows FIGS. 4A and 4B.

FIGS. 6A and 6B are cross sections for illustrating a step that follows FIGS. 5A and 5B.

FIGS. 7A and 7B are cross sections for illustrating a step that follows FIGS. 6A and 6B.

FIGS. 8A and 8B are cross sections for illustrating a configuration of an example of the thin-film magnetic head element.

FIGS. 32A and 32B are cross sections for illustrating a step of a method of manufacturing a related-art thin-film magnetic head element.

FIGS. 33A and 33B are cross sections for illustrating a step that follows FIGS. 32A and 32B.

FIGS. 34A and 34B are cross sections for illustrating a step that follows FIGS. 33A and 33B.

FIGS. 35A and 35B are cross sections of the related-art thin-film magnetic head element.

DETAILED DESCRIPTION OF EMBODIMENTS

Preferred embodiments of the invention will now be described in detail with reference to the accompanying drawings.

Figure 1:
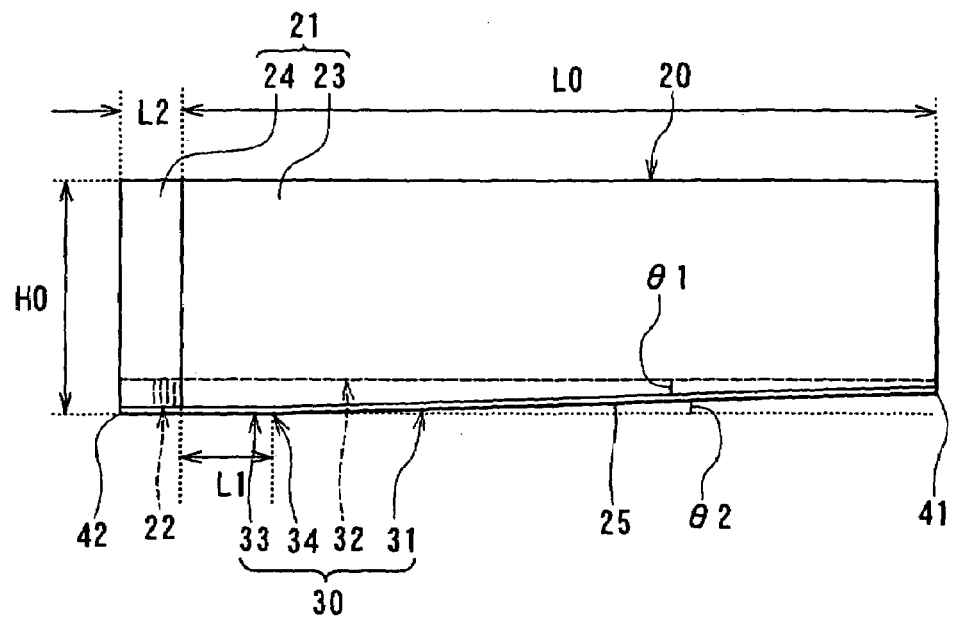
FIG. 1 is a side view of a slider according to a first embodiment of the invention.
Figure 2:
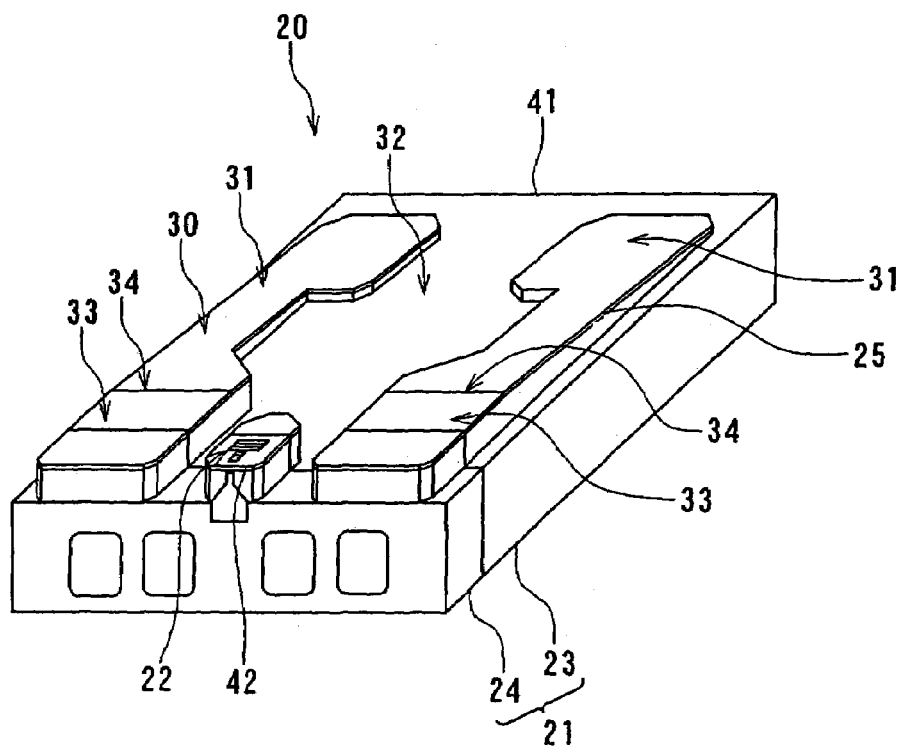
FIG. 2 is a perspective view of the slider according to the first embodiment of the invention.

Reference is now made to FIGS. 1 and 2 to describe a configuration of a slider of a thin-film magnetic head (hereinafter simply referred to as a slider) according to a first embodiment of the invention. FIG. 1 is a side view of the slider according to the embodiment. FIG. 2 is a perspective view of the slider according to the embodiment.

The slider 20 according to the embodiment comprises a slider body 21 and a thin-film magnetic head element 22. The slider body 21 has: an air bearing surface 30, an air inflow end 41, and an air outflow end 42. The air bearing surface 30 serves as a medium facing surface that faces toward a rotating recording medium. The air inflow end 41 is an end from which an airflow created by the rotation of the recording medium flows in. The air outflow end 42 is an end from which this airflow flows out. The thin-film magnetic head element 22 is disposed near the air outflow end 42 and near the air bearing surface 30 of the slider body 21.

The air bearing surface 30 has a first surface 31, a second surface 32, a third surface 33, and a border part 34. The first surface 31 includes a plurality of portions, for example, two portions that extend in a direction of air passage. The second surface 32 includes a portion that extends in the direction of air passage, the portion being disposed between the two portions of the first surface 31. The third surface 33 is disposed closer to the air outflow end 42 than the first surface 31 is. The border part 34 is located between the first surface 31 and the third surface 33.

As shown in FIG. 2, the first surface 31 is disposed near the sidewalls of the slider body 21 along the width thereof (in the lateral direction in FIG. 2) and around the thin-film magnetic head element 22.

The second surface 32 lies in parallel to the surface of the slider body 21 opposite from the air bearing surface 30. The first surface 31 and the second surface 32 have such a difference in level that the second surface 32 is located farther from the recording medium than the first surface 31 is. This difference in level varies gradually so as to increase with decreasing distance from the air outflow end 42. In other words, the first surface 31 makes a plane that slants against the surface of the slider body 21 opposite from the air bearing surface 30 and against the second surface 32. The first surface 31 and the second surface 32 preferably form an angle θ1 of 10° or smaller. It is also preferable that the angle θ1 formed between the first and second surfaces 31 and 32 does not fall below 0.1°.

The third surface 33 lies in parallel to the surface of the slider body 21 opposite from the air bearing surface 30. The first surface 31 is slanted against the third surface 33 such that the first and third surfaces 31 and 33 altogether make a convex shape (roof-like shape) bent at the border part 34. The first and third surfaces 31 and 33 preferably form an angle θ2 of 10° or smaller. It is also preferable that the angle θ2 formed between the first and third surfaces 31 and 33 does not fall below 0.1°.

The slider body 21 includes: a substrate portion 23 that has a surface facing toward the recording medium (the surface on the lower side of FIG. 1) and makes a base of the thin-film magnetic head element 22; and an insulating portion 24 that has a surface facing toward the recording medium (the surface on the lower side of FIG. 1) and surrounds the thin-film magnetic head element 22. The slider body 21 further includes a protection layer 25 that covers the surfaces of the substrate portion 23 and the insulating portion 24 facing toward the recording medium. The substrate portion 23 is made of aluminum oxide and titanium carbide, for example. The insulating portion 24 is made chiefly of alumina, for example. The protection layer 25 is made of alumina or diamond-like carbon, for example.

In the slider 20 of the embodiment, the first through third surfaces 31, 32, and 33 of the air bearing surface 30 form concavities/convexities for controlling the orientation of the slider body 21 during the rotation of the recording medium. According to the shape of the concavities/convexities of the air bearing surface 30, a force away from the recording medium or a force toward the recording medium can be given to the slider body 21 by means of airflow.

As shown in FIG. 1, the third surface 33 of the air bearing surface 30 extends across the substrate portion 23 and the insulating portion 24. The length L1 of a portion of the third surface 33 in the direction of air passage (the lateral direction in FIG. 1), the portion belonging to the substrate portion 23, is preferably equal to or less than 50% the length L0 of the entire substrate portion 23 in the direction of air passage.

The length L0 of the entire substrate portion 23 in the direction of air passage is 1.2 mm, for example. Meanwhile, the length L2 of the insulating portion 24 in the direction of air passage is about 40 to 50 µm. Therefore, the length of the slider body 21 in the direction of air passage is approximately equal to the length L0 of the entire substrate portion 23 in the direction of air passage.

The length (L1+L2) of the third surface 33 in the direction of air passage is 100 µm to 0.6 mm, for example.

At the air outflow end 42, the slider body 21 has a height (vertical length in FIG. 1) H0 of 0.3 mm, for example. The protection layer 25 has a thickness of about 3 to 5 nm, for example.

Reference is now made to FIGS. 3A to 8A, FIGS. 3B to 8B, and FIG. 9 to describe an example of a method of manufacturing the thin-film magnetic head element 22 of the slider according to the embodiment. FIGS. 3A to 8A are cross sections each orthogonal to the air bearing surface and the top surface of the substrate. FIGS. 3B to 8B are cross sections of magnetic pole portions each parallel to the air bearing surface.

In this example of the method of manufacturing the thin-film magnetic head element 22, as shown in FIGS. 3A and 3B, an insulating layer 2 made of alumina ($Al_2O_3$), for example, is first deposited to a thickness of about 5 µm on a substrate 1 made of aluminum oxide and titanium carbide ($Al_2O_3$—TiC), for example. On the insulating layer 2, a bottom shield layer 3, made of a magnetic material such as Permalloy and having a thickness of about 3 µm, is formed for the reproducing head. The bottom shield layer 3 is selectively formed on the insulating layer 2 through plating with a photoresist film as a mask, for example. Then, although not shown, an insulating layer of alumina, for example, is formed over the entire surface to a thickness of 4 to 5 µm, for example. The insulating layer is then polished through chemical mechanical polishing (CMP), for example, so that the bottom shield layer 3 is exposed, and the surface is flattened.

Next, as shown in FIGS. 4A and 4B, on the bottom shield layer 3, a bottom shield gap film 4 serving as an insulating film is formed to a thickness of about 20 to 40 nm, for example. Next, an MR element 5 for magnetic signal detection is formed to a thickness of tens of nanometers on the bottom shield gap film 4. One of ends of the MR element 5 is disposed in the air bearing surface 30. The MR element 5 may be formed through selectively etching an MR film formed through sputtering. The MR element 5 may be an element utilizing a magnetosensitive film that exhibits magnetoresistivity, such as an AMR element, a GMR element or a tunnel magnetoresistive (TMR) element. Next, a pair of electrode layers 6 are formed to a thickness of tens of nanometers on the bottom shield gap film 4. The electrode layers 6 are electrically connected to the MR element 5. Next, a top shield gap film 7 serving as an insulating film is formed to a thickness of about 20 to 40 nm, for example, on the bottom shield gap film 4 and the MR element 5. The MR element 5 is embedded in the shield gap films 4 and 7. Examples of insulating materials to be used for the shield gap films 4 and 7 include alumina, aluminum nitride, and diamond-like carbon (DLC). The shield gap films 4 and 7 may be formed through sputtering or chemical vapor deposition (CVD).

On the top shield gap film 7, a first layer 8a of a top-shield-layer-cum-bottom-pole layer (hereinafter called a bottom pole layer) 8 is selectively formed to a thickness of about 1.0 to 1.5 µm. The bottom pole layer 8 is made of a magnetic material and used for both reproducing head and recording head. The bottom pole layer 8 is made up of the first layer 8a, and a second layer 8b and a third layer 8c described later. The first layer 8a of the bottom pole layer 8 is disposed to face at least part of a thin-film coil described later.

Next, the second layer 8b and the third layer 8c of the bottom pole layer 8, each having a thickness of about 1.5 to 2.5 µm, are formed on the first layer 8a. The second layer 8b includes a magnetic pole portion of the bottom pole layer 8 and is connected to a surface of the first layer 8a that faces toward a recording gap layer described later (on the upper side of FIGS. 4A and 4B). The third layer 8c is provided for connecting the first layer 8a to a top pole layer described later, and is disposed near the center of the thin-film coil described later. A portion of the second layer 8b facing the top pole layer has an end located farther from the air bearing surface 30, and the position of this end defines the throat height.

The second layer 8b and the third layer 8c of the bottom pole layer 8 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Next, as shown in FIGS. 5A and 5B, an insulating film 9 having a thickness of about 0.3 to 0.6 µm is formed over the entire surface.

Next, a photoresist is patterned through a photolithography process to form a frame (not shown) used for making the thin-film coil through frame plating. Next, the thin-film coil 10 made of copper (Cu), for example, is formed by frame plating through the use of the frame. For example, the thickness of the coil 10 is about 1.0 to 2.0 µm and the pitch is 1.2 to 2.0 µm. The frame is then removed. In the drawings numeral 10a indicates a portion for connecting the coil 10 to a conductive layer (lead) described later.

Next, as shown in FIGS. 6A and 6B, an insulating layer 11 of alumina, for example, having a thickness of about 3 to 4 µm, is formed over the entire surface. The insulating layer 11 is then polished through CMP, for example, until the second layer 8b and the third layer 8c of the bottom pole layer 8 are exposed, and the surface is flattened. Although the coil 10 is not exposed in FIG. 6A, the coil 10 may be exposed.

Next, a recording gap layer 12 made of an insulating material is formed to a thickness of 0.2 to 0.3 µm, for example, on the second layer 8b and the third layer 8c of the bottom pole layer 8 exposed and the insulating layer 11. In general, the insulating material used for the recording gap layer 12 may be alumina, aluminum nitride, a silicon-dioxide-base material, a silicon-nitride-base material, diamond-like carbon (DLC), and so on. The recording gap layer 12 may be fabricated through sputtering or CVD.

Next, a portion of the recording gap layer 12 located on top of the third layer 8c of the bottom pole layer 8 is etched to form a contact hole for making the magnetic path. Portions of the recording gap layer 12 and the insulating layer 11 that are located on top of the connecting portion 10a of the coil 10 are also etched to form a contact hole.

Next, as shown in FIGS. 7A and 7B, on the recording gap layer 12, a top pole layer 13 having a thickness of about 2.0 to 3.0 µm is formed to extend from the air bearing surface 30 to the top of the third layer 8c of the bottom pole layer 8. At the same time, a conductive layer 16 having a thickness of about 2.0 to 3.0 µm is formed to be connected to the portion 10a of the thin-film coil 10. The top pole layer 13 is in contact with the third layer 8c of the bottom pole layer 8 and magnetically coupled thereto through the contact hole formed in the portion on top of the third layer 8c.

The top pole layer 13 may be made of NiFe (80 weight % Ni and 20 weight % Fe) or a high saturation flux density material such as NiFe (45 weight % Ni and 55 weight % Fe) through plating, or may be made of a material such as FeN or FeZrN as a high saturation flux density material through sputtering. Alternatively, a material such as CoFe or a Co-base amorphous material as a high saturation flux density material may be used. To improve the high frequency characteristic, the top pole layer 13 may be made up of a number of layers of inorganic insulating films and magnetic layers of Permalloy, for example.

Next, the recording gap layer 12 is selectively etched through dry etching, using the top pole layer 13 as a mask. The dry etching may be reactive ion etching (RIE) using a chlorine-base gas such as $BCl_2$ or $Cl_2$, or a fluorine-base gas such as $CF_4$ or $SF_6$, for example. Next, the second layer 8b of the bottom pole layer 8 is selectively etched by about 0.3 to 0.6 µm through argon ion milling, for example. A trim structure as shown in FIG. 7B is thus formed. The trim structure suppresses an increase in the effective track width due to expansion of a magnetic flux generated during writing in a narrow track.

Next, as shown in FIGS. 8A and 8B, an overcoat layer 17 of alumina, for example, having a thickness of 20 to 40 µm is formed over the entire surface. The surface of the overcoat layer 17 is then flattened and pads (not shown) for electrodes are formed on the overcoat layer 17. Finally, lapping of the slider including the foregoing layers is performed to form the air bearing surface 30 of the recording head and the reproducing head. The thin-film magnetic head element is thus completed.

Figure 9:
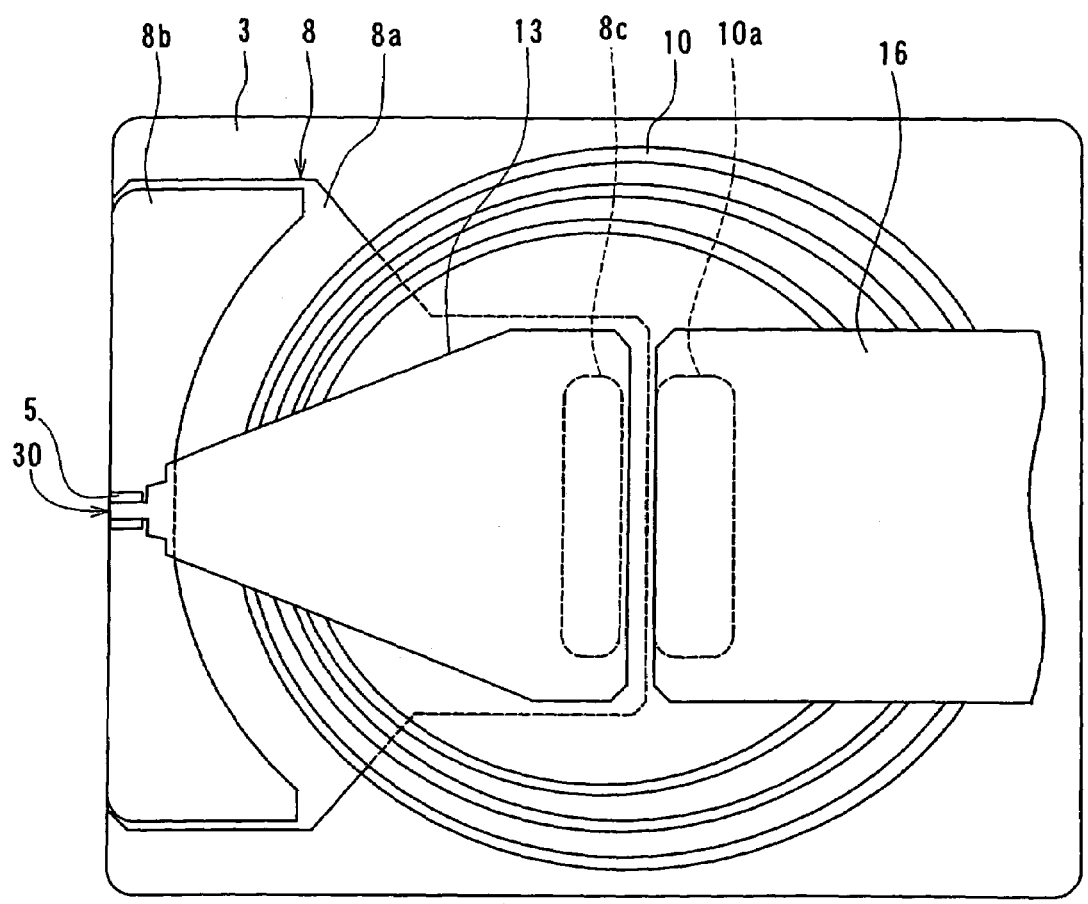
FIG. 9 is a top view of the main part of the thin-film magnetic head element shown in FIGS. 8A and 8B.

FIG. 9 is a top view illustrating the main part of the thin-film magnetic head element shown in FIGS. 8A and 8B. The overcoat layer 17 and the other insulating layers and insulating films are omitted in FIG. 9.

The thin-film magnetic head element of this example comprises the reproducing head and the recording head (induction-type electromagnetic transducer). The reproducing head includes the MR element 5 for magnetic signal detection, and the bottom shield layer 3 and the top shield layer (bottom pole layer 8) for shielding the MR element 5. Portions of the bottom shield layer 3 and the top shield layer on a side of the medium facing surface that faces toward a recording medium, i.e., air bearing surface 30, are opposed to each other, with the MR element 5 interposed between these portions of the bottom shield layer 3 and the top shield layer.

The recording head includes the bottom pole layer 8 and the top pole layer 13 magnetically coupled to each other, each of which includes at least one layer. The bottom pole layer 8 and the top pole layer 13 include magnetic pole portions that are opposed to each other and located in regions on a side of the air bearing surface 30. The recording head further includes: the recording gap layer 12 provided between the magnetic pole portion of the bottom pole layer 8 and the magnetic pole portion of the top pole layer 13; and the thin-film coil 10 at least part of which is disposed between the bottom pole layer 8 and the top pole layer 13 and is insulated from the bottom and top pole layers 8 and 13.

The substrate portion 23 of the slider body 21 shown in FIGS. 1 and 2 is composed of the substrate 1 of FIGS. 8A and 8B. The insulating portion 24 of the slider body 21 is composed mostly of the overcoat layer 17.

Next, the outline of a method of manufacturing the slider according to the embodiment is described. In the method of manufacturing the slider according to the embodiment, first, a wafer that includes a plurality of rows of portions (hereinafter called slider portions) to be sliders 20 is cut in one direction to form blocks called bars each of which includes a row of slider portions. Each slider portion includes the thin-film magnetic head element 22 and a portion to be the slider body 21. Each bar corresponds to the slider material in the present invention.

Next, the air bearing surfaces 30, the air inflow ends 41, and the air outflow ends 42 are formed on a bar. At this step, the bar is lapped while detecting the resistance values of the MR elements 5 in a plurality of slider portions included in the bar so that the slider portions become identical in MR height and in throat height, thereby forming a lapped surface of the bar, the lapped surface including the third surface 33. The lapped surface is then etched to form the second surface 32. Then, the bar is lapped with its orientation with respect to the surface plate made different from that in the step of forming the lapped surface mentioned above, thereby forming the first surface 31, the third surface 33, and the border part 34. Finally, the bar is cut between adjacent ones of slider portions to separate individual sliders 20.

Figure 10:
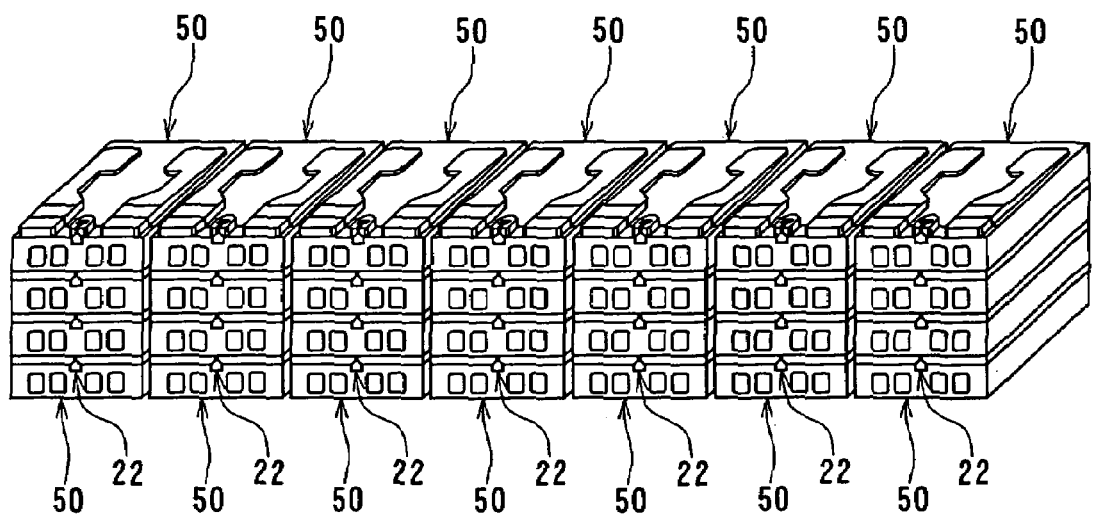
FIG. 10 is a perspective view showing an array of slider portions on a wafer to be used in a method of manufacturing the slider according to the first embodiment of the invention.

FIG. 10 is a perspective view showing an array of slider portions on a wafer. In FIG. 10, the reference numeral 50 represents each slider portion. Each bar includes a plurality of slider portions 50 aligning in a row in the lateral direction of FIG. 10. For easy understanding, FIG. 10 shows the topmost slider portions 50 as having their air bearing surfaces formed already.

Figure 11:
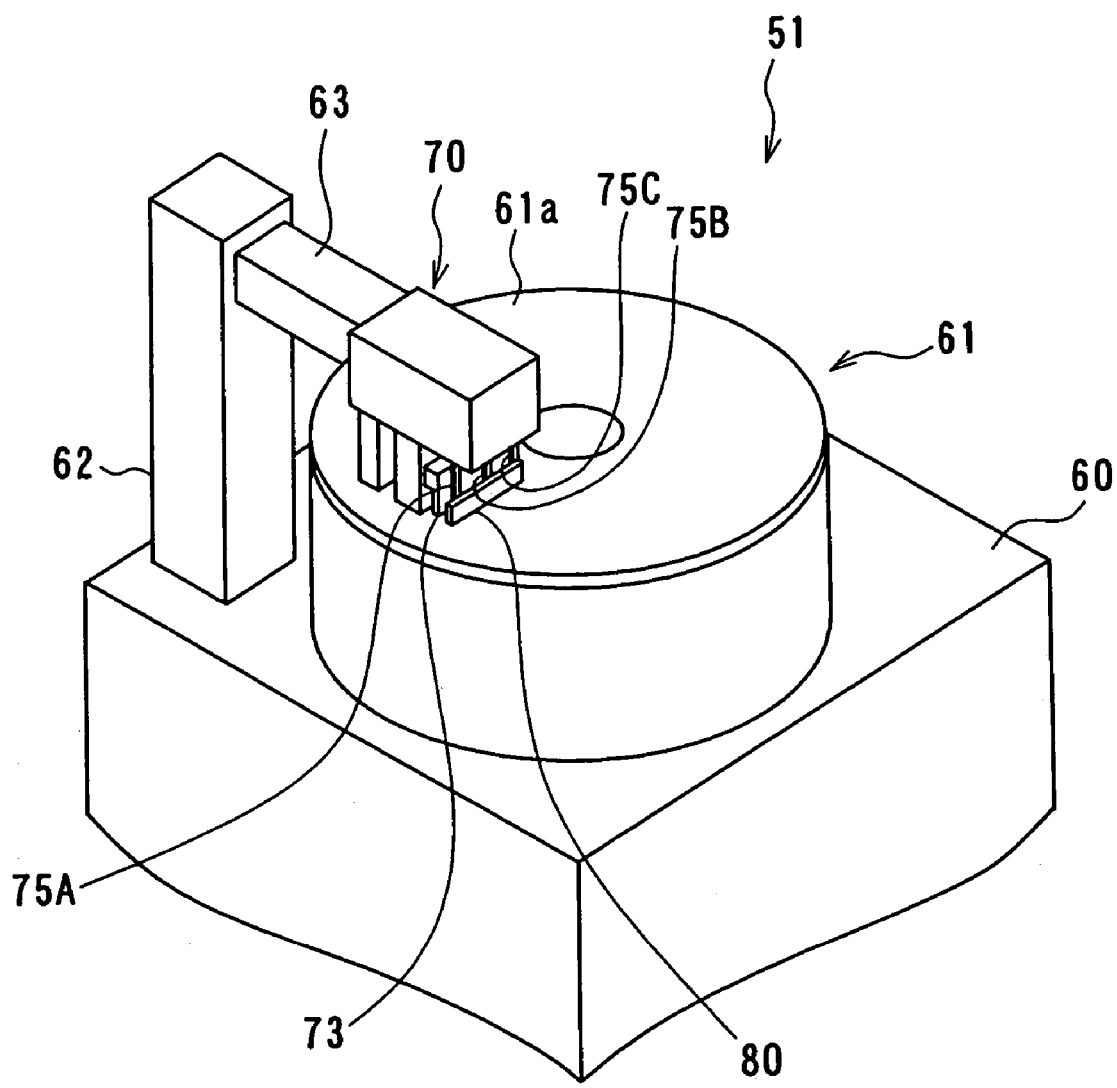
FIG. 11 is a perspective view showing a schematic configuration of a lapping apparatus for lapping a bar in the first embodiment of the invention.
Figure 12:
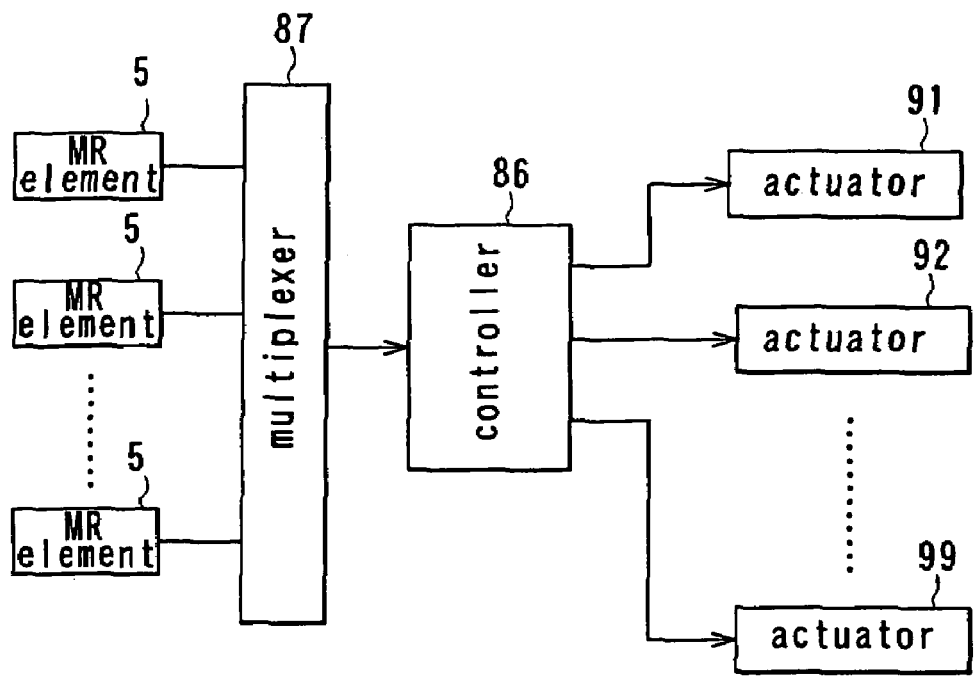
FIG. 12 is a block diagram showing an example of a circuit configuration of the lapping apparatus shown in FIG. 11.

With reference to FIGS. 11 and 12, description will now be given of an example of the method of lapping the bar while detecting the resistance values of the MR elements 5 in the plurality of slider portions 50 included in the bar so as to make the slider portions 50 equal in MR height and in throat height.

FIG. 11 is a perspective view illustrating a schematic configuration of a lapping apparatus for lapping the bar. This lapping apparatus 51 comprises: a table 60; a rotating lapping table 61 provided on the table 60; a strut 62 provided on the table 60 by the side of the rotating lapping table 61; and a material supporter 70 attached to the strut 62 through an arm 63. The rotating lapping table 61 has a lapping plate 61a to come to contact with the bar.

The material supporter 70 comprises a jig retainer 73 and three load application rods 75A, 75B and 75C placed in front of the jig retainer 73 with specific spacing. A jig 80 is to be fixed to the jig retainer 73. The jig 80 has three load application sections each of which is in the shape of a hole having an oblong cross section. Load application pins are provided at the lower ends of the load application rods 75A, 75B and 75C, respectively. Each of the load application pins has a head to be inserted to each of the load application sections (holes) of the jig 80, the head having an oblong cross section. Each of the load application pins is driven by an actuator (not shown) in the vertical, horizontal (along the length of the jig 80) and rotational directions.

The jig 80 has a retainer for retaining a bar. With this jig 80, the retainer and the bar are deformed by applying loads in various directions to the three load application sections. The air bearing surface 30 of the bar is thereby lapped while the throat heights and MR heights of the thin-film magnetic head elements 22 in the bar are controlled so that the target values are obtained.

FIG. 12 is a block diagram showing an example of the circuit configuration of the lapping apparatus shown in FIG. 11. This lapping apparatus comprises: nine actuators 91 to 99 for applying loads in the three directions to the load application sections of the jig 80; a controller 86 for controlling the nine actuators 91 to 99 through monitoring the resistance values of a plurality of MR elements 5 in the bar; and a multiplexer 87, connected to the MR elements 5 in the bar through a connector (not shown), for selectively connecting one of the MR elements 5 to the controller 86.

In this lapping apparatus, the controller 86 monitors the resistance values of the MR elements 5 in the bar through the multiplexer 87, and controls the actuators 91 to 99 so that throat height and MR height of every thin-film magnetic head element 22 fall within a certain limited tolerance.

Reference is now made to FIGS. 13 to 17 to describe the method of manufacturing a slider according to the embodiment in detail. Each of FIGS. 13 to 17 is a side view of the slider portion 50. The slider portion 50 includes the substrate portion 23, the insulating portion 24, and the thin-film magnetic head element 22.

Figure 13:
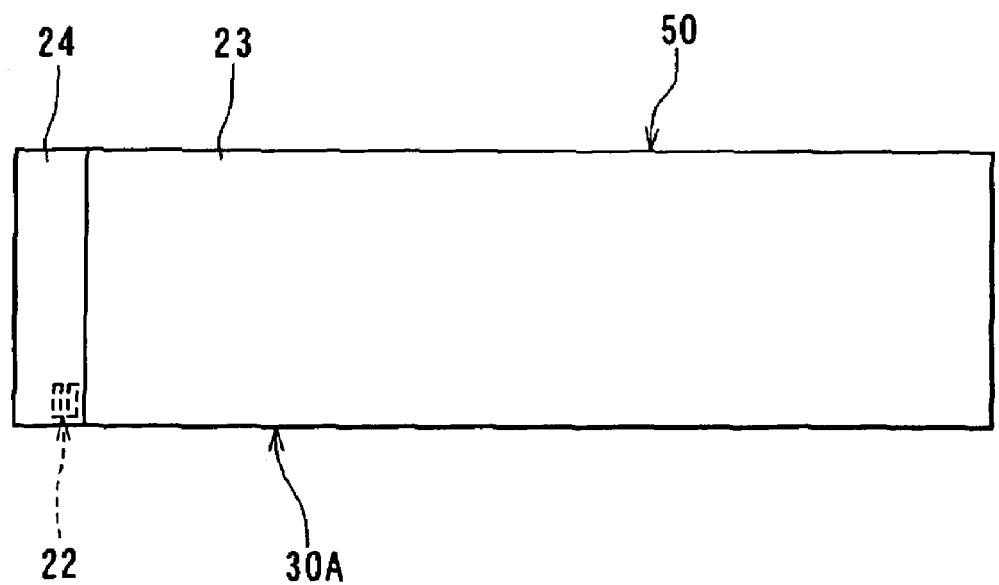
FIG. 13 is a side view showing a step in the method of manufacturing the slider according to the first embodiment of the invention.

In the method of manufacturing a slider according to the embodiment, as shown in FIG. 13, a wafer including a plurality of rows of slider portions 50 is initially cut in one direction to form bars each of which includes a row of slider portions 50. Each bar has a surface 30A to be the air bearing surfaces 30.

Figure 14:
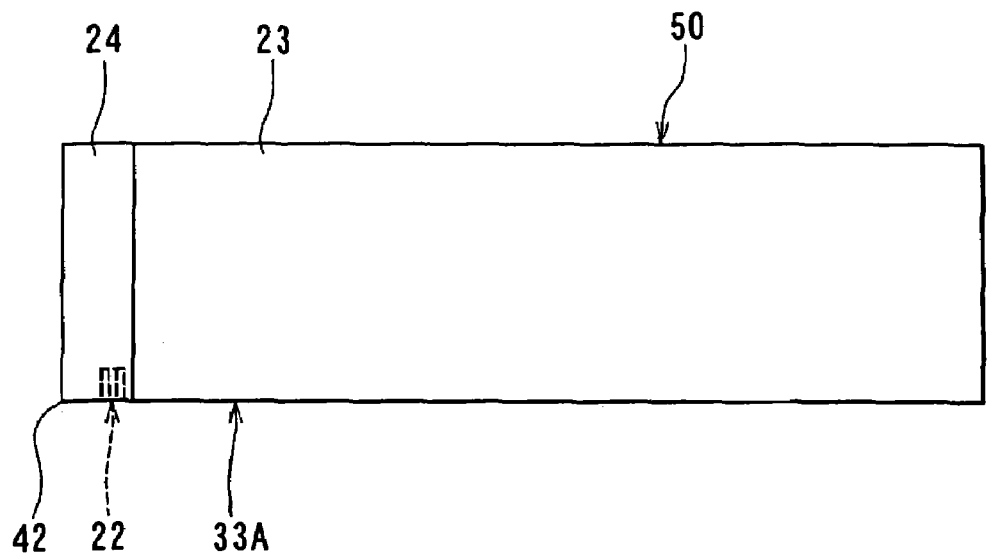
FIG. 14 is a side view for illustrating a step that follows FIG. 13.

Then, a step shown in FIG. 14 is performed. In this step, the surface 30A of the bar is lapped while detecting the resistance values of the MR elements 5 in a plurality of the slider portions 50 included in the bar so as to make every slider portion 50 equal in MR height and in throat height. The lapped surface 33A including the third surface 33 of the air bearing surface 30 is thereby formed for each slider portion 50. At this point, the air outflow end 42 is formed for each slider portion 50.

Figure 15:
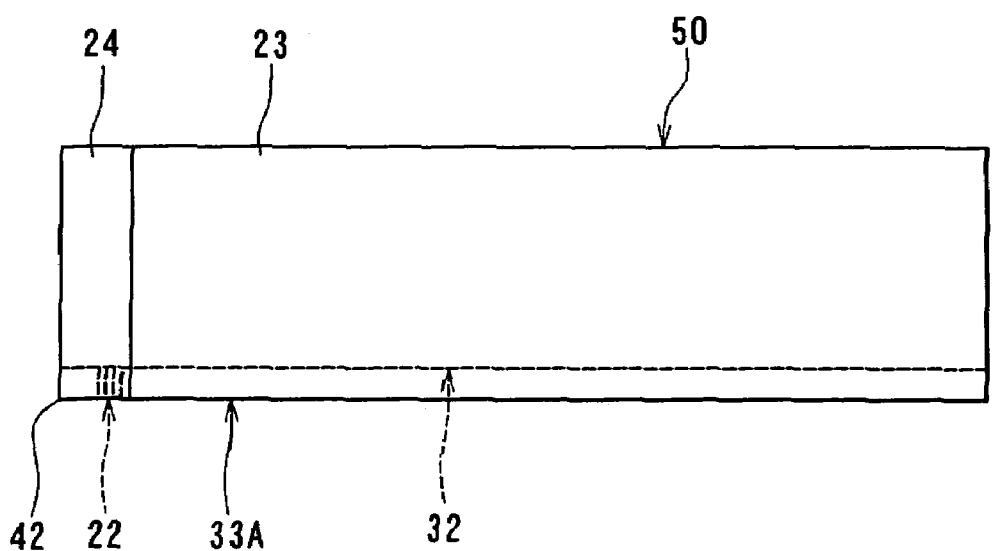
FIG. 15 is a side view for illustrating a step that follows FIG. 14.

Then, as shown in FIG. 15, the lapped surface 33A is selectively etched to form the second surface 32. The selective etching of the lapped surface 33A is effected, for example, by dry etching after forming a photoresist mask on the lapped surface 33A. The depth of the second surface 32 from the lapped surface 33A is about 2 to 3 µm, for example. The etching of the lapped surface 33A is effected, for example, by reactive ion etching (RIE) using a chlorine-base gas such as $BCl_2$ or $Cl_2$, or a fluorine-base gas such as $CF_4$ or $SF_6$, for example.

Figure 16:
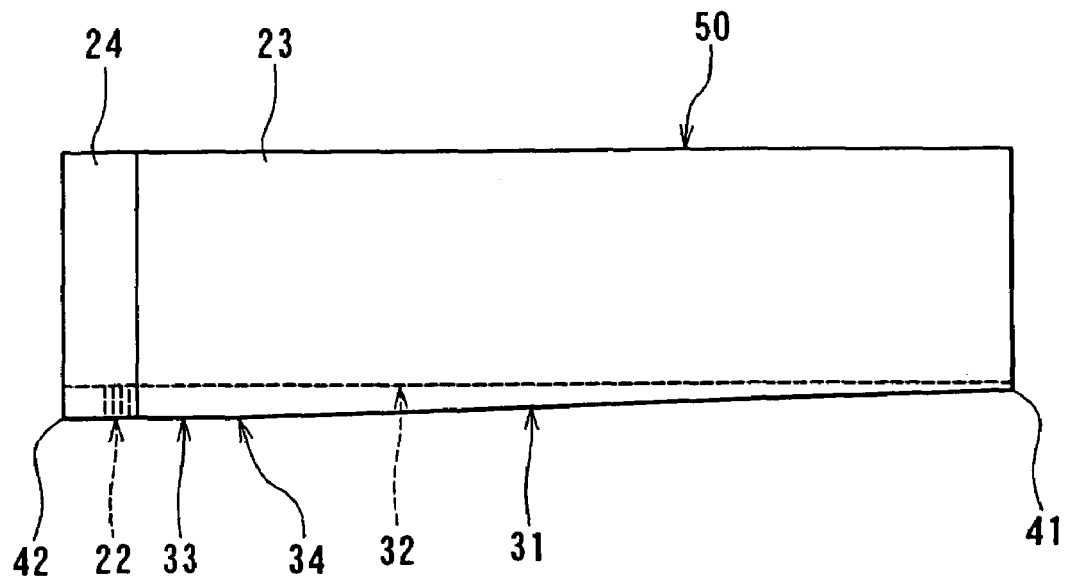
FIG. 16 is a side view for illustrating a step that follows FIG. 15.

Then, a step shown in FIG. 16 is performed. In this step, part of the lapped surface 33A is lapped by lapping the bar with its orientation with respect to the surface plate made different from that in the step of forming the lapped surface 33A. The first surface 31, the third surface 33, and the border part 34 of the air bearing surface 30 are thereby formed for each slider portion 50. At this point, the air inflow end 41 is formed for each slider portion 50.

Figure 17:
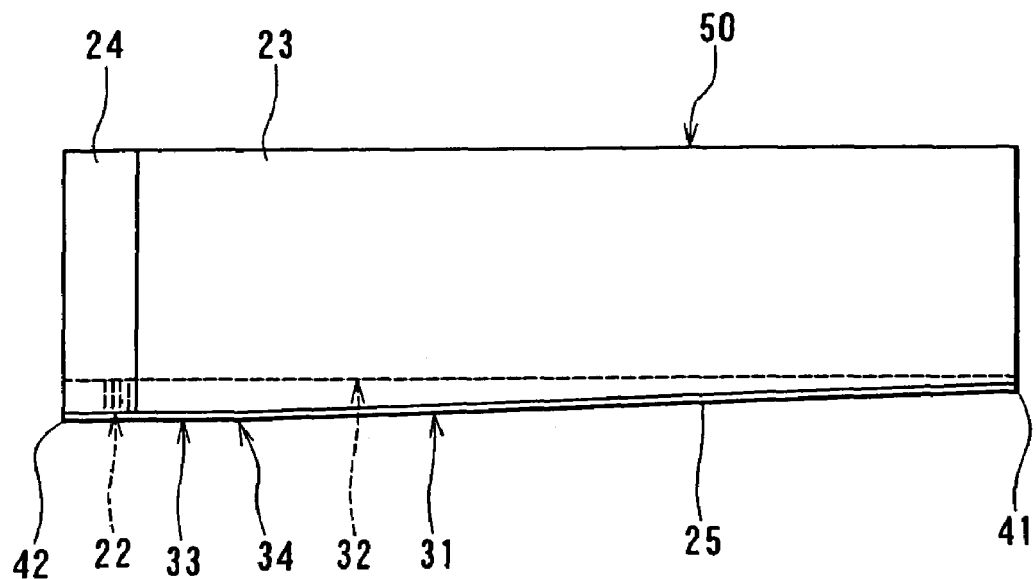
FIG. 17 is a side view for illustrating a step that follows FIG. 16.

Then, as shown in FIG. 17, the protection layer 25 is formed to cover the surfaces of the substrate portion 23 and the insulating portion 24 facing toward the recording medium. The protection layer 25 is made of alumina or diamond-like carbon, for example. The protection layer 25 has a thickness of about 3 to 5 nm, for example. Subsequently, the bar is cut between adjacent ones of slider portions 50 into individual sliders 20.

Concurrently with the formation of the second surface 32 for each slider portion 50, edges of the air outflow end 42 may be chamfered.

Figure 18:
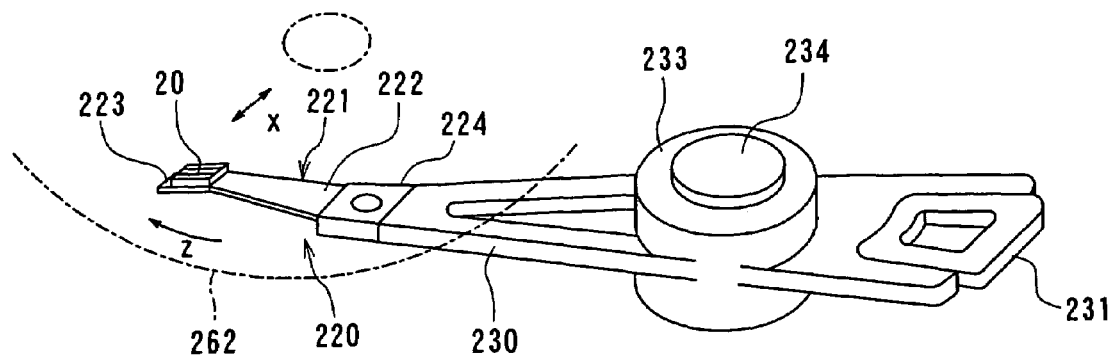
FIG. 18 is a perspective view of a head gimbal assembly incorporating the slider according to the first embodiment of the invention.
Figure 19:
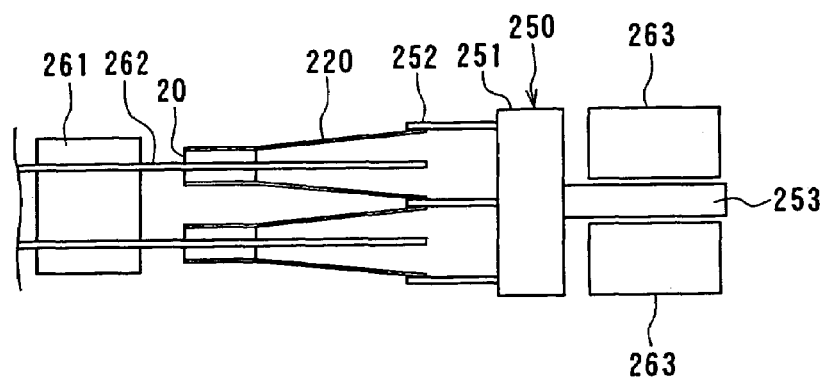
FIG. 19 is an explanatory view showing the main part of a hard disk drive in which the slider according to the first embodiment of the invention is used.
Figure 20:
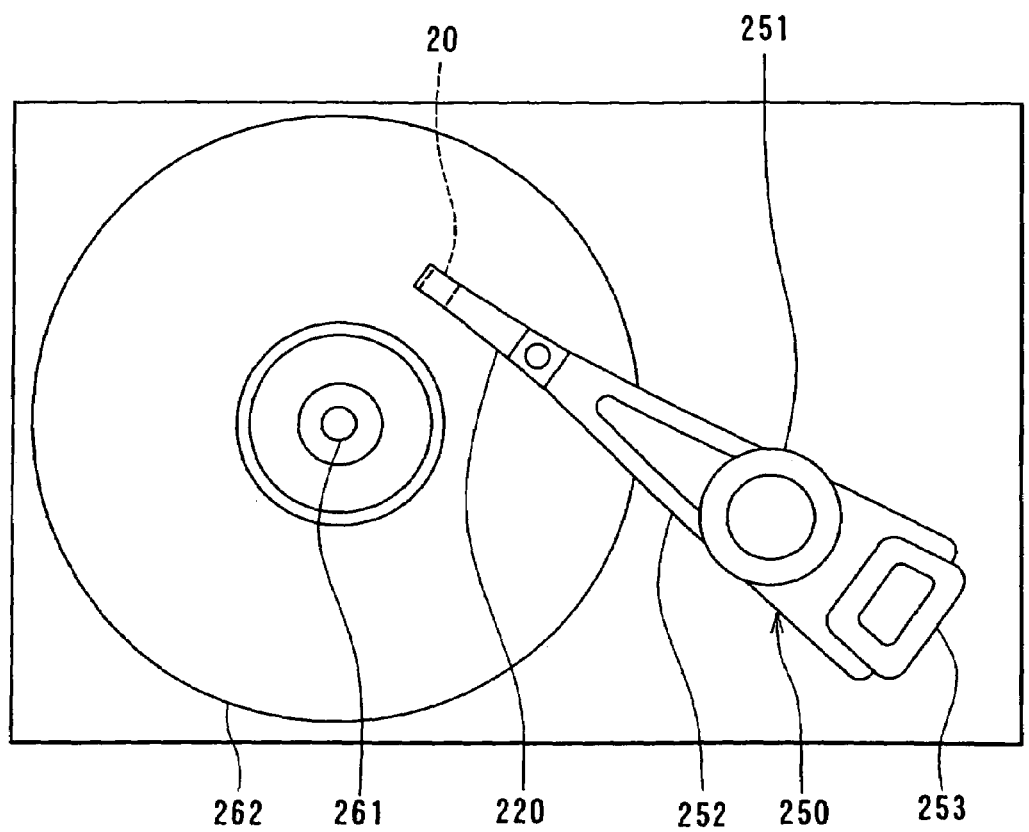
FIG. 20 is a top view of the hard disk drive in which the slider according to the first embodiment of the invention is used.

Reference is now made to FIGS. 18 to 20 to describe a head gimbal assembly and a hard disk drive incorporating the slider 20 of the present embodiment. Now, reference is made to FIG. 18 to describe the head gimbal assembly 220. In a hard disk drive, the slider 20 is disposed to face toward a hard disk platter 262 that is a circular-plate-shaped recording medium to be rotated and driven. The head gimbal assembly 220 comprises the slider 20 and a suspension 221 that flexibly supports the slider 20. The suspension 221 incorporates: a plate-spring-shaped load beam 222 made of stainless steel, for example; a flexure 223 to which the slider 20 is joined, the flexure being provided at an end of the load beam 222 and giving an appropriate degree of freedom to the slider 20; and a base plate 224 provided at the other end of the load beam 222. The base plate 224 is attached to an arm 230 of an actuator that moves the slider 20 along the x direction across the track of the hard disk platter 262. The actuator incorporates the arm 230 and a voice coil motor that drives the arm 230. A gimbal section that maintains the orientation of the slider 20 is provided in the portion of the flexure 223 on which the slider 20 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a plurality of head gimbal assemblies 220 and a carriage with a plurality of arms is called a head stack assembly, in which the head gimbal assemblies 220 are each attached to the arms.

FIG. 18 illustrates an example of the head arm assembly. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Reference is now made to FIGS. 19 and 20 to describe an example of the head stack assembly and the hard disk drive. FIG. 19 is an explanatory view illustrating the main part of the hard disk drive. FIG. 20 is a top view of the hard disk drive. The head stack assembly 250 incorporates a carriage 251 having a plurality of arms 252. A plurality of head gimbal assemblies 220 are each attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 20 are allocated to each of the platters 262, such that the two sliders 20 face each other with each of the platters 262 in between. The voice coil motor includes permanent magnets 263 located to face each other, the coil 253 of the head stack assembly 250 being placed between the magnets 263.

The head stack assembly 250 except the slider 20 and the actuator support the slider 20 and align it with respect to the hard disk platter 262.

In this hard disk drive, the actuator moves the slider 20 across the track of the platter 262 and aligns the slider 20 with respect to the platter 262. The thin-film magnetic head incorporated in the slider 20 writes data on the platter 262 through the use of the recording head and reads data stored on the platter 262 through the use of the reproducing head.

Figure 21:
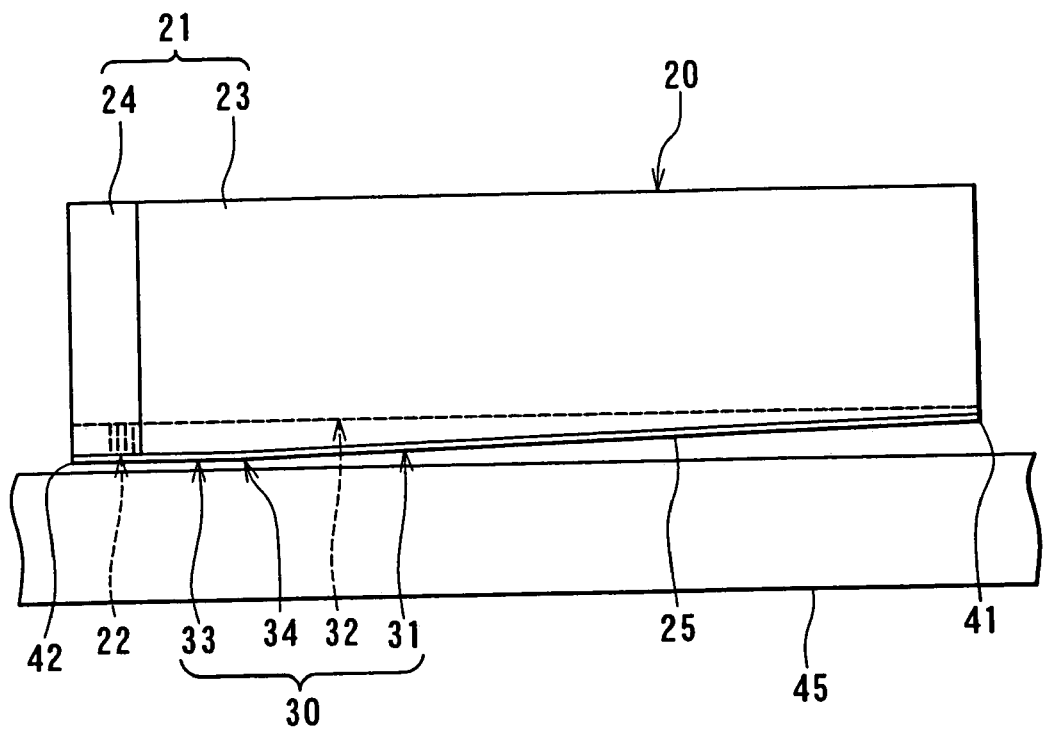
FIG. 21 is a side view showing a state of the slider according to the first embodiment of the invention while the recording medium is rotating.
Figure 22:
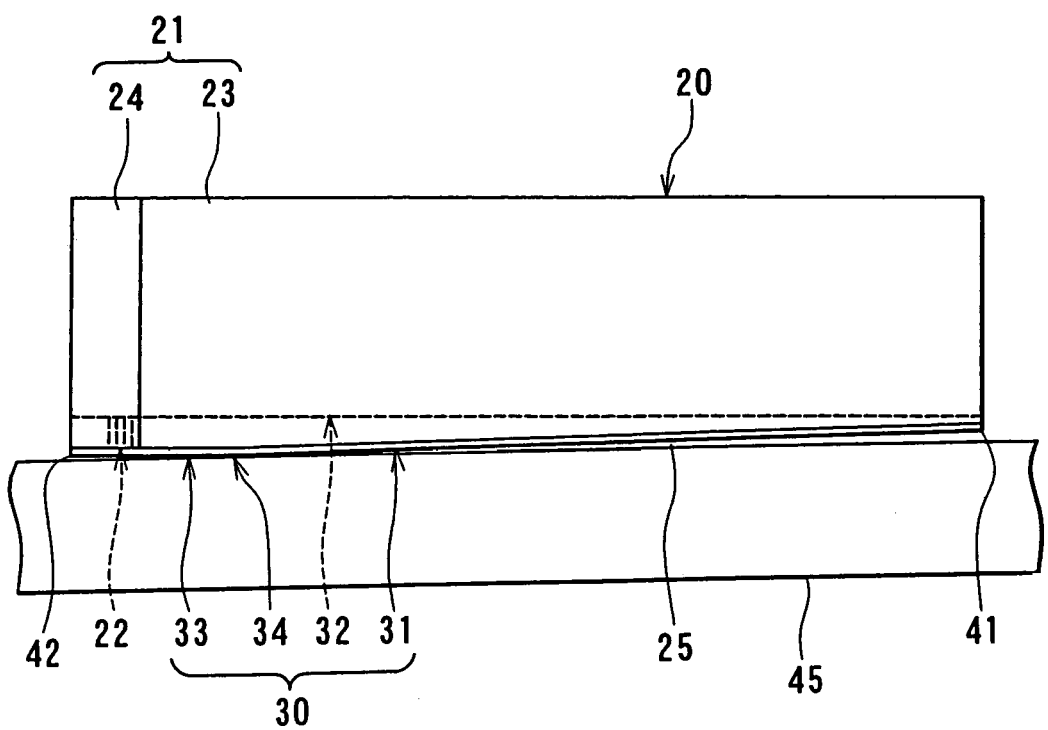
FIG. 22 is a side view showing a state of the slider according to the first embodiment of the invention while the recording medium is at rest.

Reference is now made to FIGS. 21 and 22 to describe the functions and effects of the slider 20 according to the embodiment. FIG. 21 is a side view showing a state of the slider 20 while the recording medium 45 is rotating. FIG. 22 is a side view showing a state of the slider 20 while the recording medium 45 is at rest.

As shown in FIG. 21, while the recording medium 45 is rotating, the slider body 21 flies by means of the airflow created by the rotation of the recording medium 45 and is off the surface of the recording medium 45. On the other hand, as shown in FIG. 22, the slider body 21 is in contact with the surface of the recording medium 45 while the recording medium 45 is at rest.

As shown in FIG. 21, while the recording medium 45 is rotating, the first surface 31 of the air bearing surface 30 slants against the surface of the recording medium 45 such that the smaller the distance between a point in the first surface 31 and the air inflow end 41, the greater the distance between the point in the first surface 31 and the recording medium 45. While the recording medium 45 is rotating, the third surface 33 of the air bearing surface 30 is almost parallel to the surface of the recording medium 45. While the recording medium 45 is rotating, the first surface 31 preferably forms an angle of 10° or smaller with respect to the surface of the recording medium 45. While the recording medium 45 is rotating, it is also preferable that the angle that the first surface 31 forms with the surface of the recording medium 45 is not smaller than 0.1°. The angle that the first surface 31 forms with the surface of the recording medium 45 while the recording medium 45 is rotating can be controlled according to the shape of the concavities/convexities of the air bearing surface 30.

Figure 37:
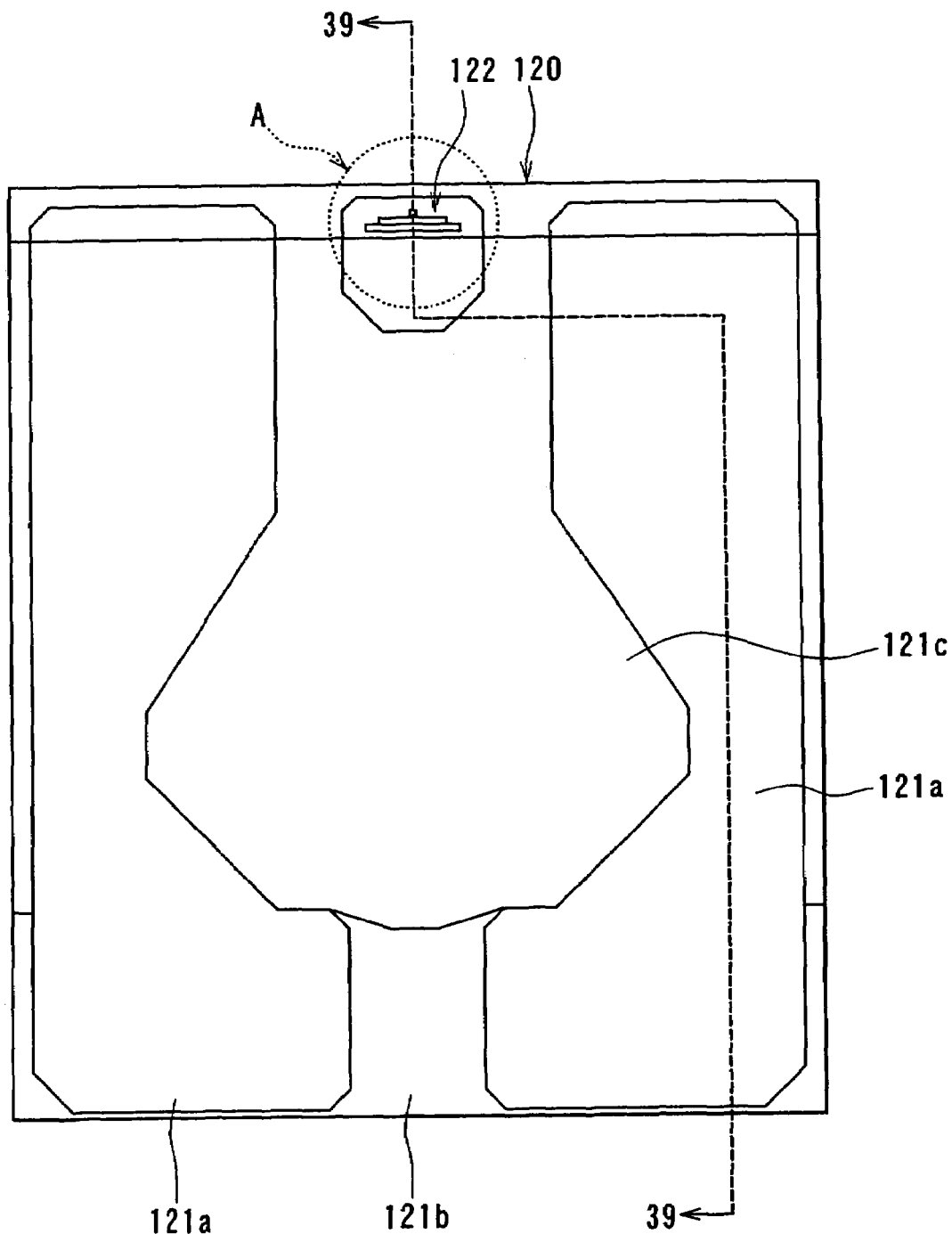
FIG. 37 is a bottom view illustrating an example of a configuration of the air bearing surface of a related-art slider.
Figure 38:
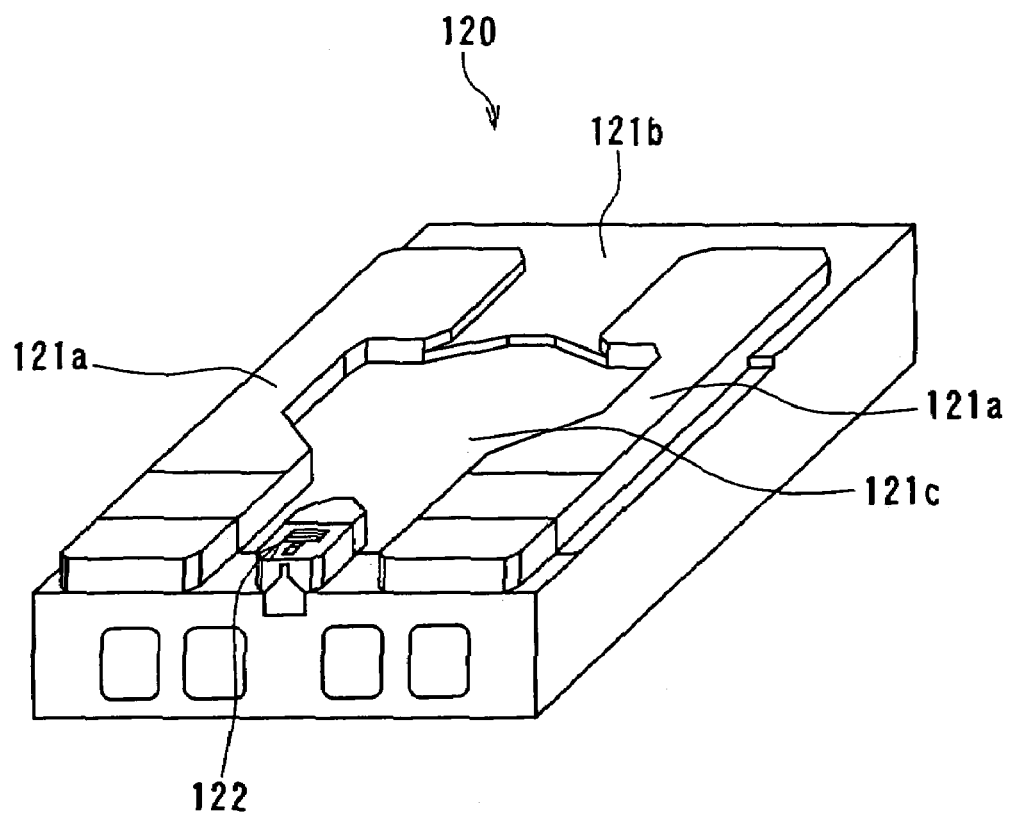
FIG. 38 is a perspective view of the related-art slider.
Figure 39:
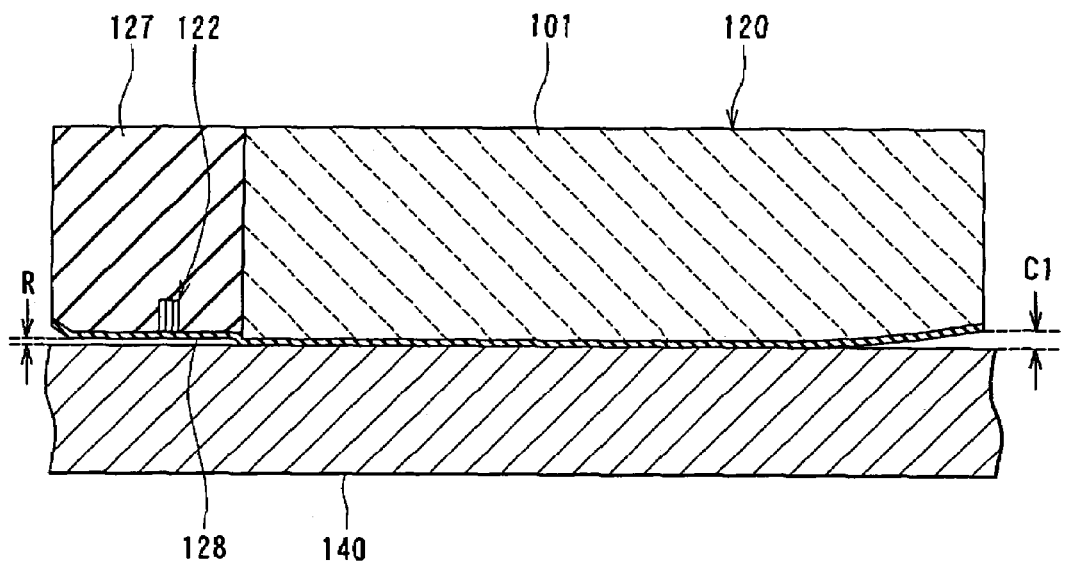
FIG. 39 is a cross section illustrating the related-art slider and a recording medium in a state in which the recording medium is at rest.
Figure 40:
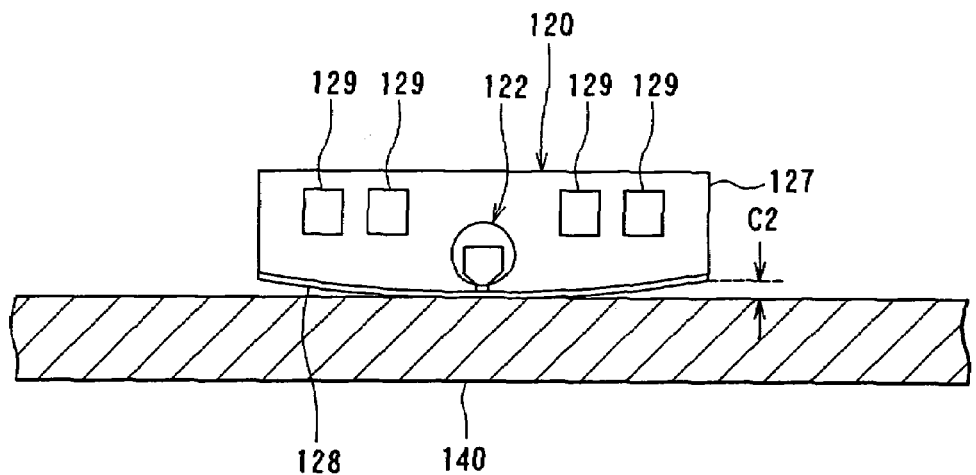
FIG. 40 is a front view of the related-art slider as viewed from the upper side of FIG. 37.
Figure 41:
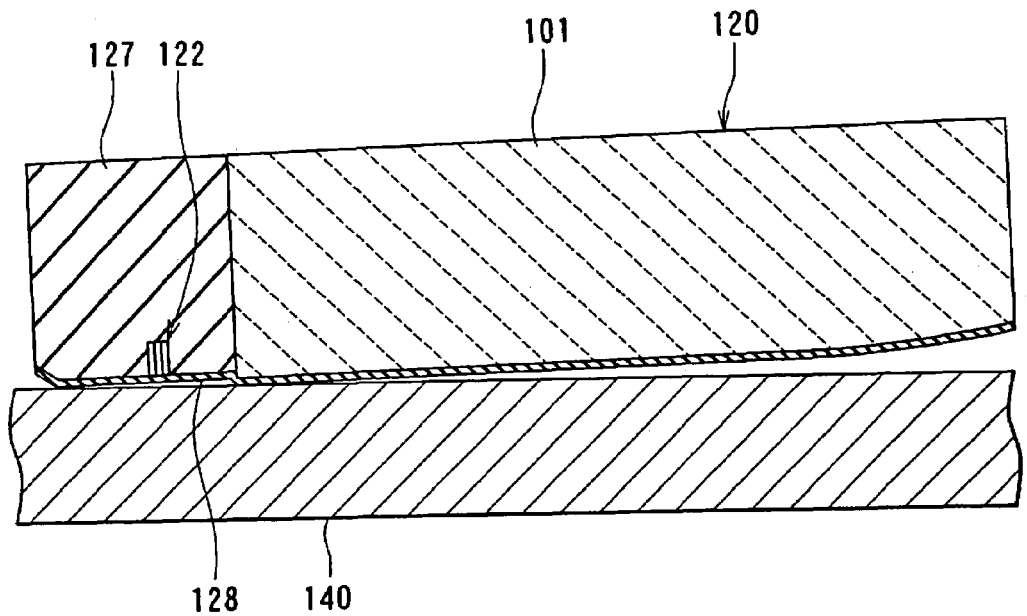
FIG. 41 is a cross section illustrating the related-art slider and the recording medium in a state in which the recording medium has just started rotation from a resting state.
Figure 42:
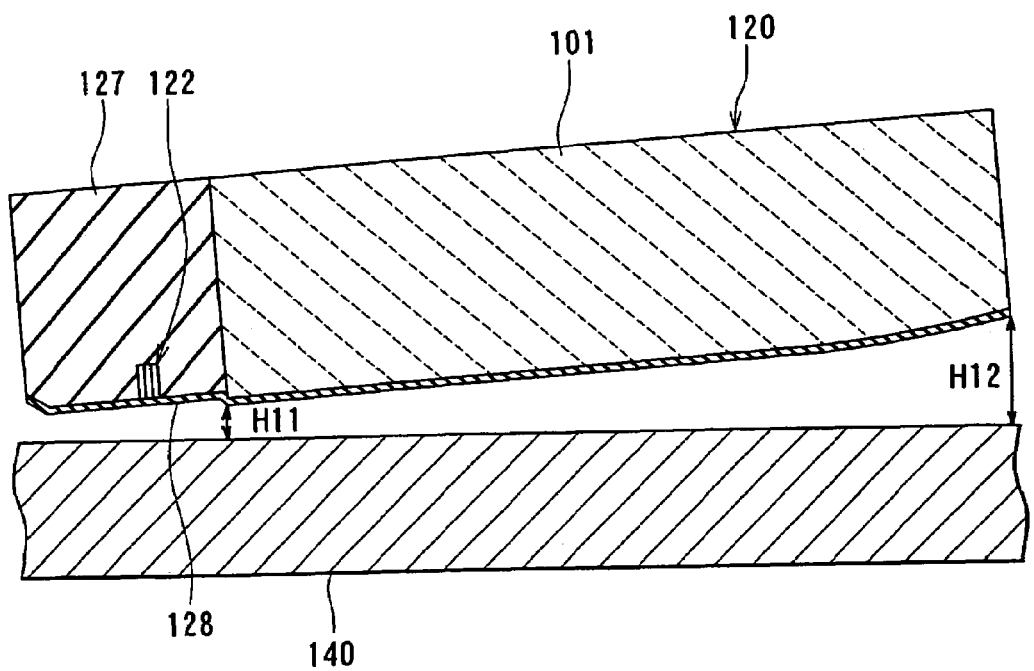
FIG. 42 is a cross section illustrating the related-art slider flying over the surface of the recording medium.

According to the embodiment, while the recording medium 45 is rotating, a pressure for moving the slider body 21 away from the recording medium 45 occurs between the first surface 31 and the recording medium 45. In the embodiment, the difference in level between the first and second surfaces 31 and 32 varies gradually so as to increase with decreasing distance from the air outflow end 42. Therefore, during the rotation of the recording medium 45, the air passing through between the second surface 32 and the recording medium 45 gradually increases in volume. Consequently, a negative pressure for drawing the slider body 21 toward the recording medium 45 occurs between the second surface 32 and the recording medium 45. This negative pressure allows a portion of the slider body 21 in the vicinity of the air outflow end 42, in particular, to be close to the recording medium 45 while the medium is rotating. Consequently, according to the slider 20 of the embodiment, a reduction in magnetic space is achieved. In terms of reduction in magnetic space, it is possible for the slider 20 of the embodiment to work equivalently or better than a slider whose air bearing surface has three surfaces of different levels as shown in FIGS. 37 and 38, by appropriately designing the shape of concavities/convexities of the air bearing surface 30. That is, according to the slider 20 of the embodiment, the distance between the thin-film magnetic head element 22 and the surface of the recording medium 45 can be made no greater than the distance between the thin-film magnetic head element and the surface of the recording medium for the case of using the slider shown in FIGS. 37 and 38.

The air bearing surface shown in FIGS. 37 and 38 has three surfaces of different levels. In this case, negative pressure is generated by the second surface 121b and the third surface 121c whose levels are different from each other. In contrast, according to the embodiment, negative pressure is generated by the second surface 32 having no step. Therefore, air flows more smoothly through between the slider 20 and the recording medium 45 as compared with the case of the slider shown in FIGS. 37 and 38. According to the embodiment, it is thus easy to control the orientation of the slider body 21 during the rotation of the recording medium 45.

In the embodiment, when the recording medium 45 shifts from the rotating state to the resting state and the slider body 21 comes into contact with the surface of the recording medium 45, the border part 34 is the first to make contact with the surface of the recording medium 45. When the recording medium 45 shifts from the resting state to the rotating state and the slider body 21 takes off from the surface of the recording medium 45, the border part 34 is the last to depart from the surface of the recording medium 45. Thus, the border part 34 functions like a wheel of an aircraft.

As described above, the slider 20 of the embodiment makes contact with the surface of the recording medium 45 at the border part 34 of the slider body 21. Therefore, as compared with conventional sliders, the area of the slider body 21 contacting the surface of the recording medium 45 is extremely smaller, yielding an extreme reduction in the frictional resistance between the slider body 21 and the surface of the recording medium 45. Therefore, according to the slider 20 of the embodiment, the initial contact of the slider body 21 with the surface of the recording medium 45 and the separation of the slider body 21 from the surface of the recording medium 45 can be performed smoothly. As a result, it is possible to prevent occurrence of damage to the recording medium 45 and the thin-film magnetic head element 22 due to a collision between the slider 20 and the recording medium 45.

In the slider 20 of the embodiment, the area of the slider body 21 contacting the surface of the recording medium 45 when it is at rest is extremely smaller than in conventional sliders. It is therefore possible to prevent the slider 20 from sticking to the recording medium 45.

According to the slider 20 of the embodiment, as shown in FIG. 21, during the rotation of the recording medium 45 the first surface 31 of the air bearing surface 30 slants against the surface of the recording medium 45 such that the smaller the distance between a point in the first surface 31 and the air inflow end 41, the greater the distance between the point in the first surface 31 and the recording medium 45. As a result, the thin-film magnetic head element 22 gets closer to the surface of the recording medium 45. Thus, according to the slider 20 of the embodiment, during the rotation of the recording medium 45, the thin-film magnetic head element 22 is allowed to be close to the surface of the recording medium 45 while the first surface 31 of the air bearing surface 30 is kept farther from the recording medium 45 than the thin-film magnetic head element 22. Therefore, the embodiment makes it possible to attain a greater reduction in magnetic space while avoiding a collision between the slider 20 and the recording medium 45.

If the edges of the air outflow end 42 are chamfered, it is possible to prevent a collision between the slider 20 and the recording medium 45 with higher reliability.

As has been described, the slider 20 of the embodiment makes it possible to reduce the magnetic space. Furthermore, it is possible to prevent the slider 20 from sticking to the recording medium 45, and to prevent damage to the recording medium 45 and the thin-film magnetic head element 22 due to a collision between the slider 20 and the recording medium 45.

Figure 23:
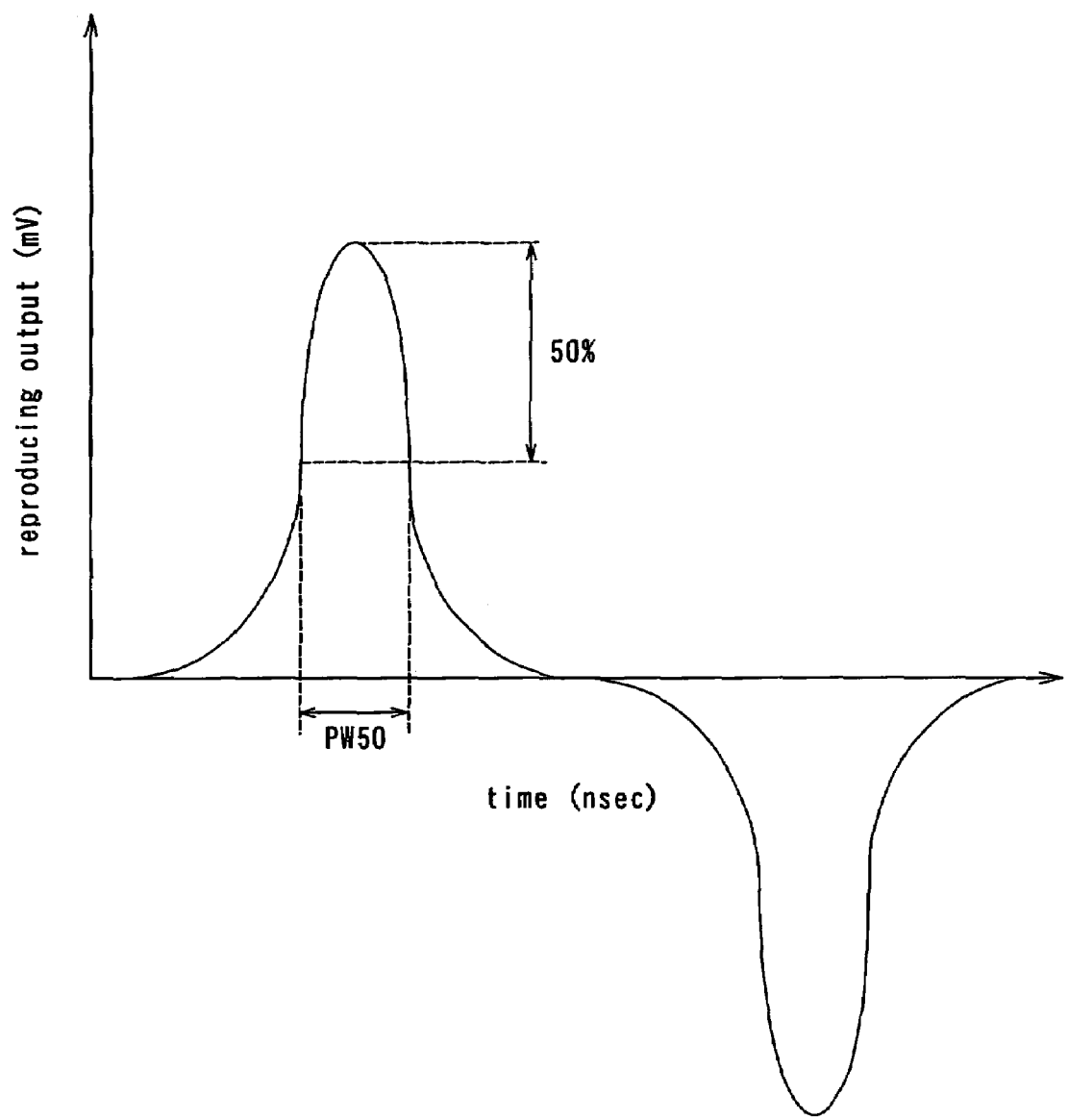
FIG. 23 is a plot for illustrating an example of the waveform of reproducing output of the thin-film magnetic head element of the slider according to the first embodiment of the invention.

Through the reduction in the magnetic space, the embodiment makes it possible to improve the reproducing output and reduce the half width of the reproducing output of the reproducing head of the thin-film magnetic head element 22. Consequently, the recording density can be improved. FIG. 23 shows an example of the waveform of the reproducing output of the thin-film magnetic head element 22 of the slider 20. In FIG. 23 'PW50' indicates the half width of the reproducing output. The half width PW50 is the time required for the reproducing output to reach 50 percent or greater of the peak value. On the other hand, as a result of reduction in the magnetic space, it is also possible to improve the overwrite property and nonlinear transition shift of the recording head of the thin-film magnetic head element 22.

The embodiment thus makes it possible to improve the characteristics of both the reproducing head and the recording head of the thin-film magnetic head element 22. As a result, it is possible to improve the yield of hard disk drives that implement the slider 20 of the embodiment.

To form the air bearing surface having the three surfaces of different levels as shown in FIGS. 37 and 38, two steps of forming a photoresist mask and two steps of etching are required. In contrast, the embodiment involves only a single step of forming a photomask and a single step of etching. Instead, the embodiment requires an extra step of lapping the slider body 21 as compared to the case of forming the air bearing surface shown in FIGS. 37 and 38. The step of lapping the slider body 21 is, however, simpler than the steps of forming a photoresist mask and performing etching. Thus, according to the embodiment, the process for forming the air bearing surface 30 of the slider 20 is simpler than that for forming the air bearing surface shown in FIGS. 37 and 38. The manufacturing cost of the slider 20 is therefore lower.

In the embodiment, the air bearing surface 30 of the slider 20 is formed easier than in the cases where crowns or cambers are formed on the air bearing surfaces of sliders. Besides, there will occur no problem associated with the crown/camber formation. Thus, according to the embodiment it is possible to precisely determine the shape of the air bearing surface 30, improve the yield of the slider 20 and reduce the manufacturing costs of the slider 20, as compared to the cases where crowns or cambers are formed on the air bearing surfaces of sliders. In view of the foregoing, the embodiment of the invention is excellent in terms of mass productivity.

In the embodiment, the length L1 of the portion of the third surface 33 belonging to the substrate portion 23 in the direction of air passage is preferably equal to or less than 50% the length L0 of the entire substrate portion 23 in the direction of air passage. If this is satisfied, during rotation of the recording medium 45 the length L1 of the portion (the portion of the third surface 33 belonging to the substrate portion 23) that approaches the surface of the recording medium 45 out of the entire substrate portion 23 becomes equal to or less than the length of the portion (the first surface 31) that gets away from the surface of the recording medium 45. It is thereby possible to prevent a collision between the slider 20 and the recording medium 45 with yet higher reliability.

Figure 24:
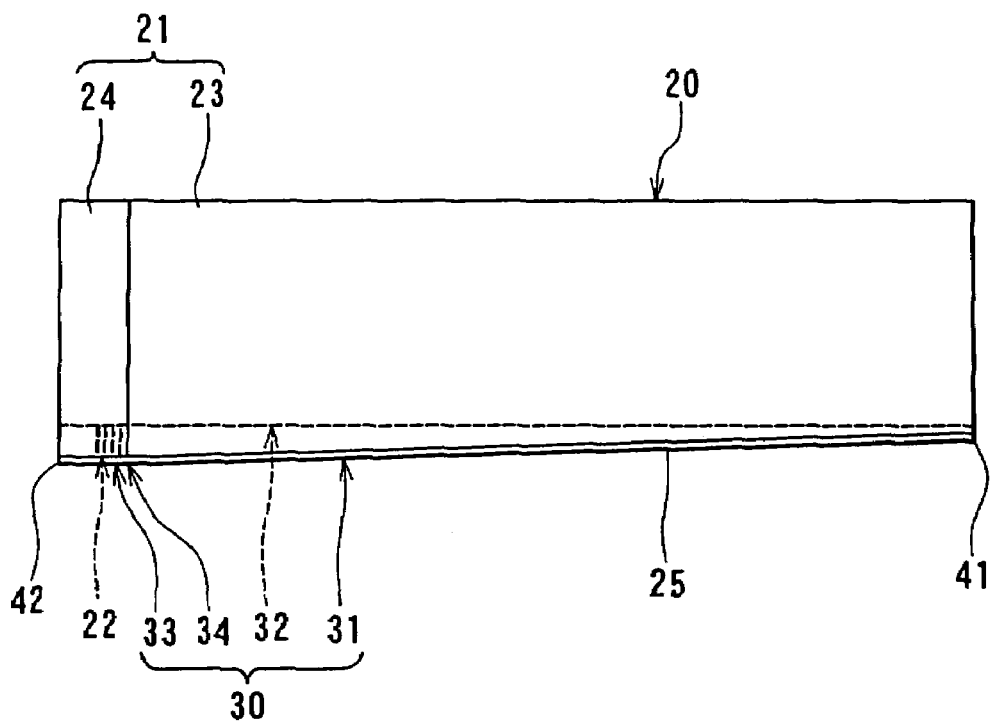
FIG. 24 is a side view showing another example of the shape of the slider according to the first embodiment of the invention.

FIG. 24 is a side view showing another example of the shape of the slider 20 according to the embodiment. In this example, in the air bearing surface 30 the position of the border part 34 between the first surface 31 and the third surface 33 coincides with the position of the border between the substrate portion 23 and the insulating portion 24. In this example, the length of the third surface 33 in the direction of air passage is about 40 to 100 µm.

Figure 25:
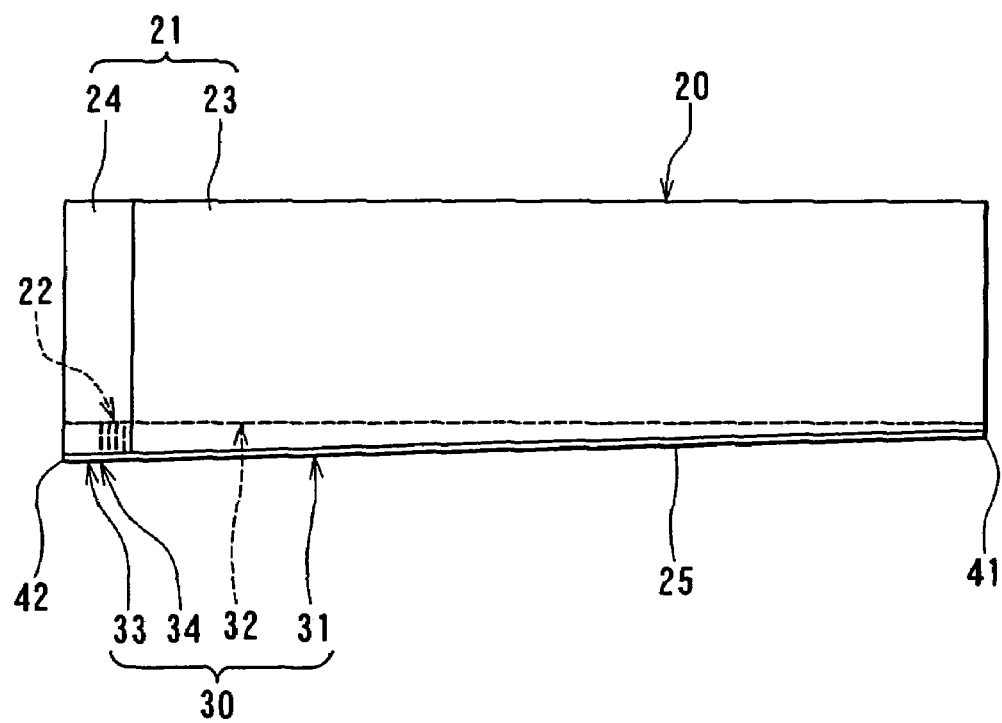
FIG. 25 is a side view showing still another example of the shape of the slider according to the first embodiment of the invention.

FIG. 25 is a side view showing still another example of the shape of the slider 20 according to the embodiment. In this example, in the air bearing surface 30 the border part 34 between the first surface 31 and the third surface 33 is located between the thin-film magnetic head element 22 and the air outflow end 42. In this example, the length of the third surface 33 in the direction of air passage is about 10 to 50 µm.

Figure 26:
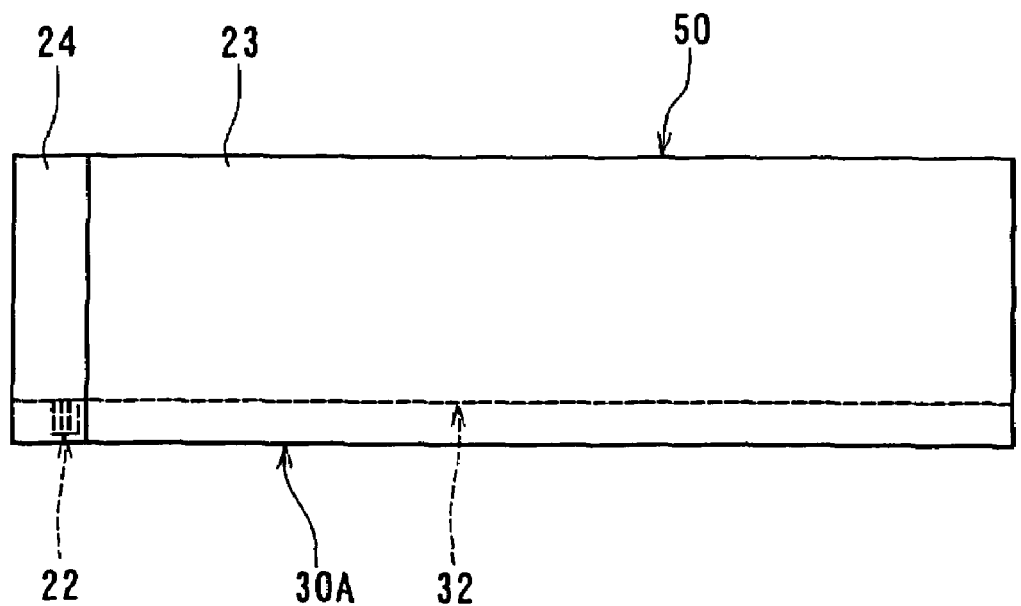
FIG. 26 is a side view showing a step in a method of manufacturing a slider according to a second embodiment of the invention.
Figure 27:
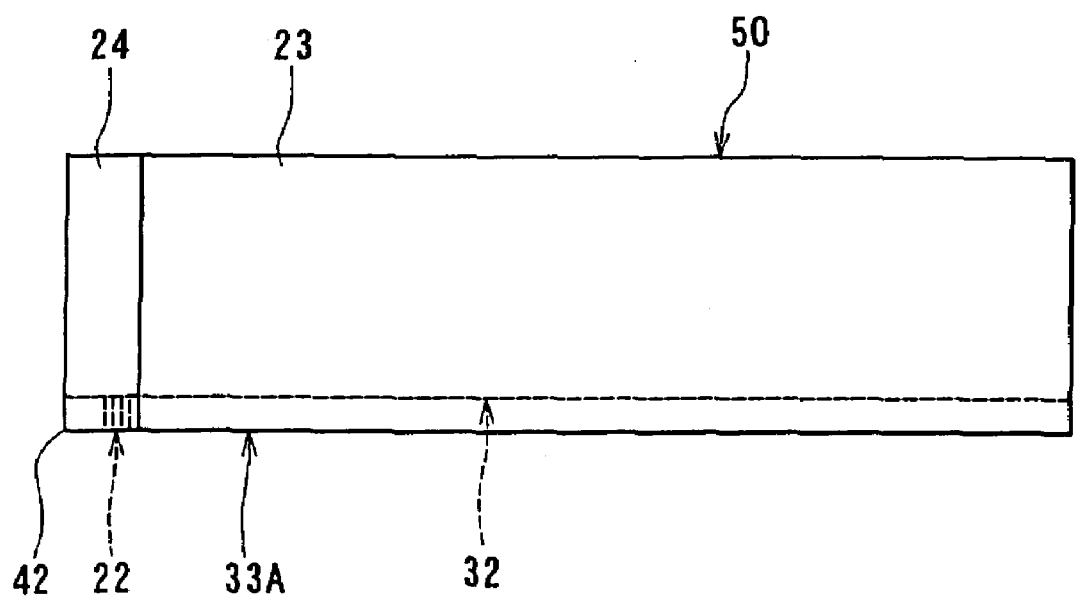
FIG. 27 is a side view for illustrating a step that follows FIG. 26.

Reference is now made to FIGS. 26 and 27 to describe a method of manufacturing a slider according to a second embodiment of the invention. The slider 20 of the present embodiment has the same configuration as that of the first embodiment. In the method of manufacturing the slider according to the embodiment, as in the first embodiment, a wafer including a plurality of rows of slider portions 50 is initially cut in one direction to form bars each of which includes a row of slider portions 50, as shown in FIG. 13. Each bar has the surface 30A to be the air bearing surfaces 30.

Then, in this embodiment the surface 30A of the bar is selectively etched to form the second surface 32, as shown in FIG. 26. The etching is performed in the same manner as that for the case of forming the second surface 32 in the first embodiment. The depth of the second surface 32 from the surface 30A is about 2 to 3 µm, for example.

Then, a step shown in FIG. 27 is performed. In this step, the bar is lapped while detecting the resistance values of the MR elements 5 in a plurality of the slider portions 50 included in the bar so as to make every slider portion 50 equal in MR height and in throat height. The lapped surface 33A including the third surface 33 of the air bearing surface 30 is thereby formed for each slider portion 50. At this point, the air outflow end 42 is formed for each slider portion 50.

Then, the step shown in FIG. 16 is performed as in the first embodiment. In this step, part of the lapped surface 33A is lapped by lapping the bar with its orientation with respect to the surface plate made different from that in the step of forming the lapped surface 33A. The first surface 31, the third surface 33, and the border part 34 of the air bearing surface 30 are thereby formed for each slider portion 50. At this point, the air inflow end 41 is formed for each slider portion 50.

Then, the step shown in FIG. 17 is performed as in the first embodiment. In this step, the protection layer 25 is formed to cover the surfaces of the substrate portion 23 and the insulating portion 24 facing toward the recording medium. The protection layer 25 is made of alumina or diamond-like carbon, for example. The protection layer 25 has a thickness of about 3 to 5 nm, for example. Subsequently, the bar is cut between adjacent ones of slider portions 50 into individual sliders 20.

The remainder of the configuration, functions and effects of the present embodiment are the same as those of the first embodiment.

Figure 28:
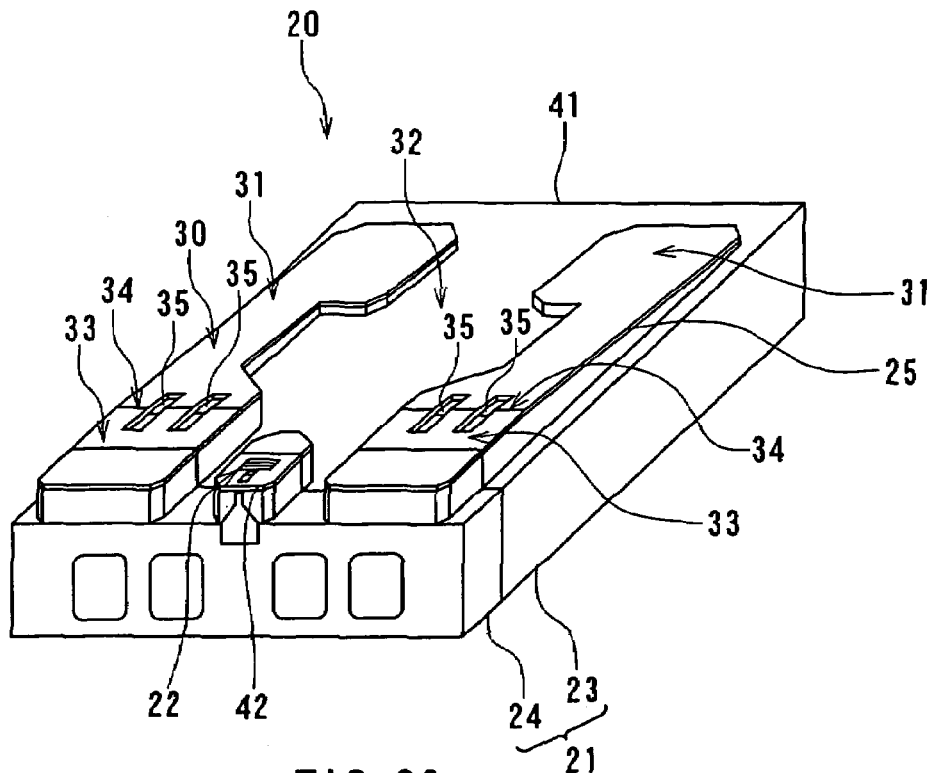
FIG. 28 is a perspective view showing an example of a configuration of a slider according to a third embodiment of the invention.
Figure 29:
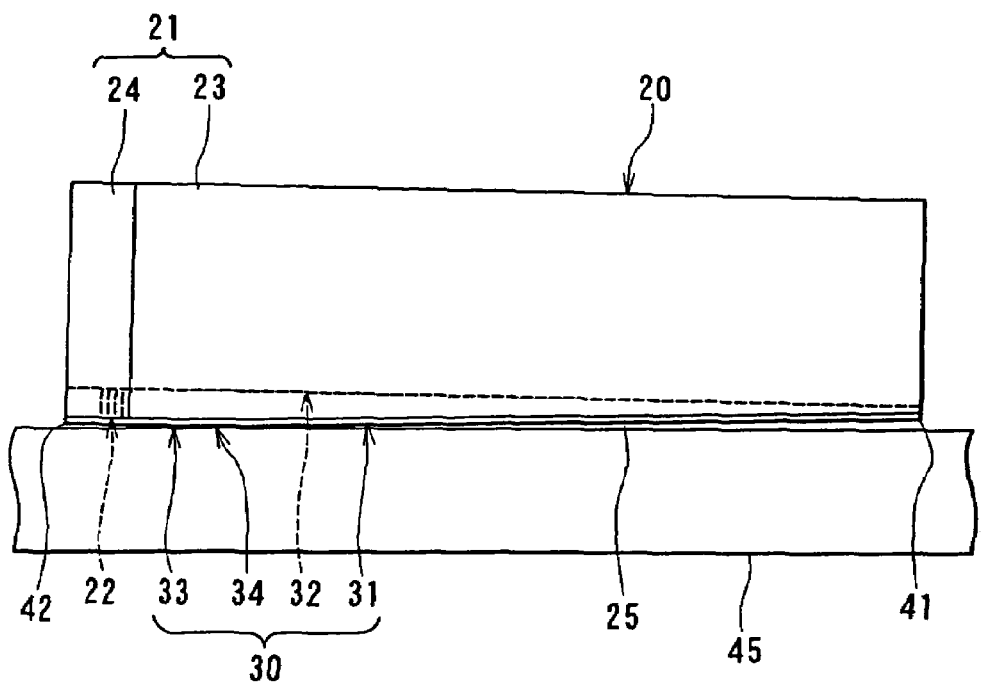
FIG. 29 is a side view showing a state of the slider shown in FIG. 28 while the recording medium is rotating and at rest.
Figure 30:
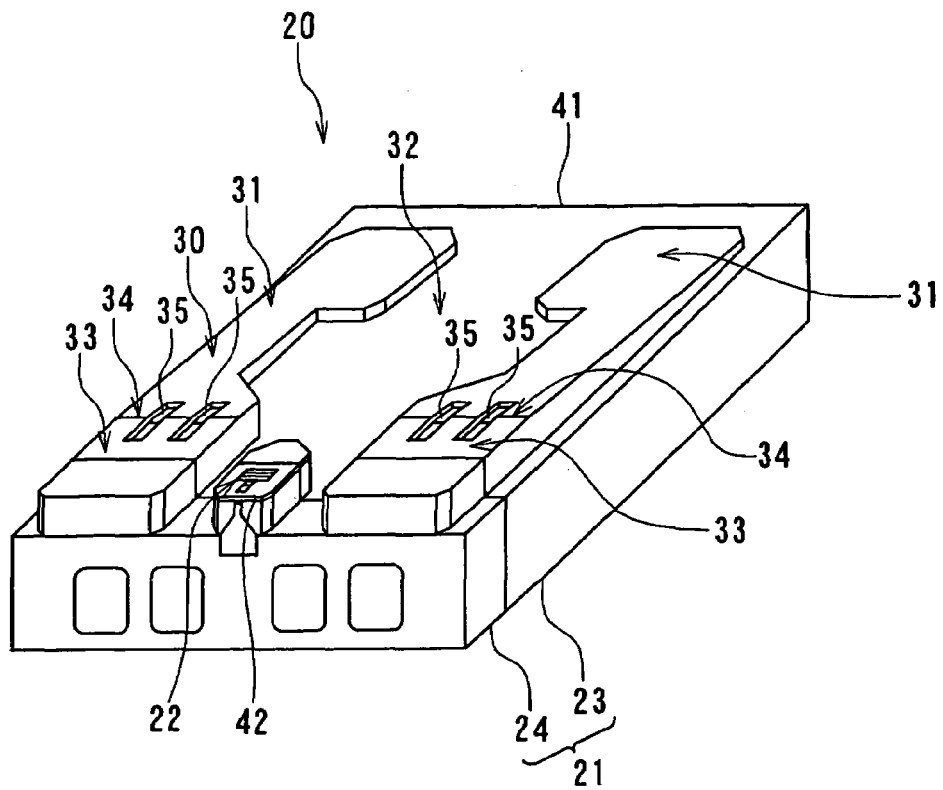
FIG. 30 is a perspective view showing another example of the configuration of the slider according to the third embodiment of the invention.

Reference is now made to FIGS. 28 to 30 to describe a slider according to a third embodiment of the invention. FIG. 28 is a perspective view showing an example of the configuration of the slider according to the embodiment. According to this embodiment, the slider body 21 of the slider 20 makes contact with the surface of the recording medium 45 at the border part 34 of the air bearing surface 30 regardless of whether the recording medium 45 is rotating or at rest.

As shown in FIG. 28, the slider 20 of the embodiment has a plurality of recesses 35 formed in the air bearing surface 30 in a region including the border part 34. The slider 20 of the embodiment is otherwise configured the same as in the first or second embodiment. According to the slider 20 of the embodiment, since the air bearing surface 30 has the recesses 35 formed in the regions including the border part 34, the area of the slider body 21 contacting the surface of the recording medium 45 becomes smaller than in the first embodiment.

The slider 20 shown in FIG. 28 has the protection layer 25. The recesses 35 are formed by etching the protection layer 25.

FIG. 30 shows the slider 20 of the embodiment with no protection layer 25. In this slider 20, the recesses 35 are formed by etching the substrate portion 23.

In the method of manufacturing the slider 20 of the embodiment, the step of forming the air bearing surface 30 includes the step of forming the recesses 35 mentioned above. In the method of manufacturing the slider 20 having the protection layer 25, the step of forming the recesses 35 is performed after the step of forming the protection layer 25. The recesses 35 are formed by etching the protection layer 25. In the method of manufacturing the slider 20 having no protection layer 25, the step of forming the recesses 35 is performed after the step of forming the first through third surfaces 31, 32 and 33. The recesses 35 are formed by etching the substrate portion 23. The other steps of the method of manufacturing the slider 20 are the same as those in the first or second embodiment.

Reference is now made to FIG. 29 to describe the functions and effects of the slider 20 according to the embodiment. FIG. 29 is a side view showing a state of the slider 20 while the recording medium 45 is rotating and while it is at rest. As shown in FIG. 29, in this embodiment the slider body 21 of the slider 20 is in contact with the surface of the recording medium 45 at the border part 34 of the air bearing surface 30 regardless of whether the recording medium 45 is rotating or at rest. Regardless of whether the recording medium 45 is rotating or at rest, the first surface 31 of the air bearing surface 30 slants against the surface of the recording medium 45 such that the smaller the distance between a point in the first surface 31 and the air inflow end 41, the greater the distance between the point in the first surface and the recording medium 45. In either case where the recording medium 45 is rotating or at rest, the third surface 33 of the air bearing surface 30 may be in contact with the surface of the recording medium 45 or slant against the surface of the recording medium 45 such that the smaller the distance between a point in the third surface 33 and the air outflow end 42, the greater the distance between the point in the third surface 33 and the recording medium 45.

The slider 20 of the embodiment allows a greater reduction in magnetic space as compared with the slider 20 of the first or second embodiment. According to the embodiment, since the slider body 21 is always in contact with the surface of the recording medium 45, it is possible to prevent occurrence of a collision between the slider body 21 and the recording medium 45 which would be caused by the slider body 21 coming into contact with and getting away from the surface of the recording medium 45.

According to the slider 20 of the embodiment, since the air bearing surface 30 has the recesses 35 formed in the regions including the border part 34, the area of the slider body 21 contacting the surface of the recording medium 45 is smaller than in the first or second embodiment. Frictional resistance between the slider body 21 and the surface of the recording medium 45 is thereby reduced.

Since the slider 20 of the embodiment allows a greater reduction in magnetic space as compared with the sliders 20 of the first and second embodiments, it is possible to achieve a greater improvement in the reproducing output and a greater reduction in half width of the reproducing head. Further, it is also possible to achieve greater improvements in the overwrite property and nonlinear transition shift of the recording head. Accordingly, a greater improvement in the yield of hard disk drives can be achieved.

In the slider 20 of the embodiment, the air bearing surface 30 has concavities/convexities formed by the first through third surfaces 31, 32 and 33 as in the first or second embodiment. In this embodiment, the concavities/convexities serve to control the orientation of the slider body 21 while the recording medium 45 is rotating.

The remainder of the configuration, functions and effects of the present embodiment are the same as those of the first or second embodiment.

Figure 31:
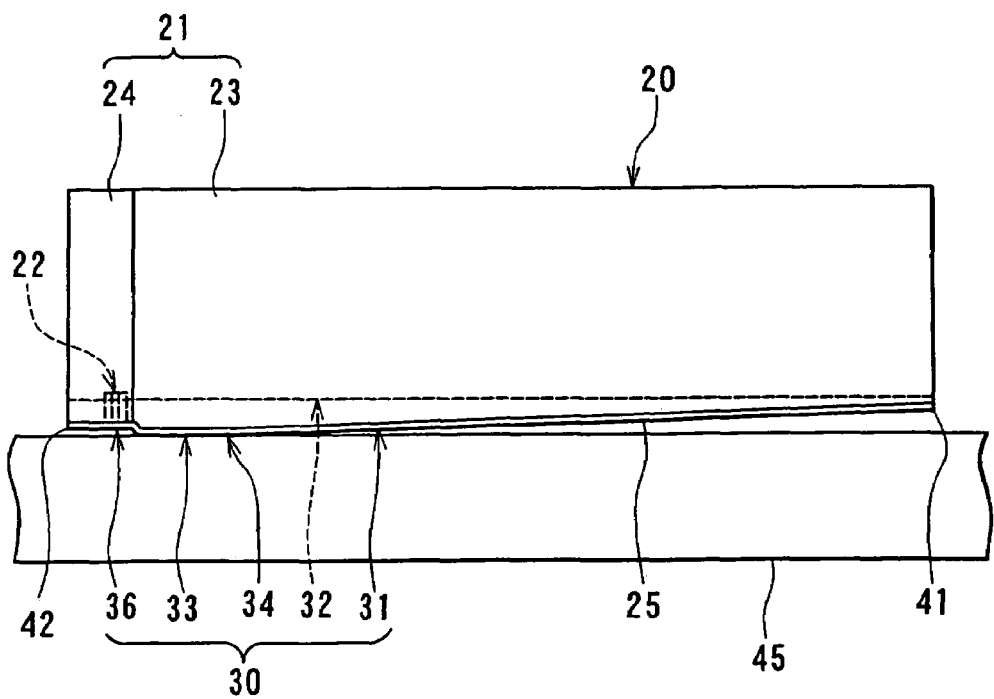
FIG. 31 is a side view showing a state of a slider according to a fourth embodiment of the invention while the recording medium is rotating and at rest.
Figure 36:
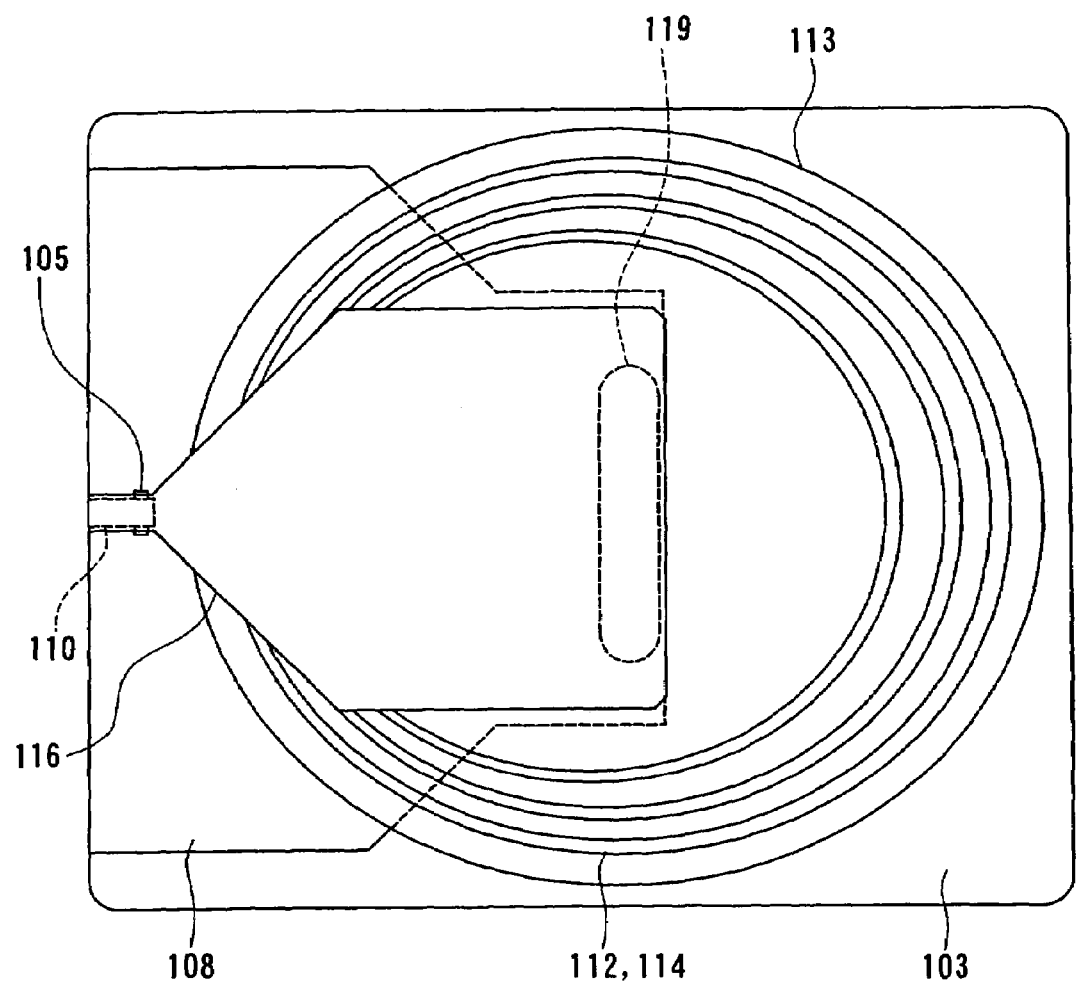
FIG. 36 is a top view of the related-art thin-film magnetic head element.

Reference is now made to FIG. 31 to describe a slider according to a fourth embodiment of the invention. FIG. 31 is a side view showing a state of the slider 20 while the recording medium 45 is rotating and while it is at rest. According to this embodiment, the slider body 21 of the slider 20 makes contact with the surface of the recording medium 45 regardless of whether the recording medium 45 is rotating or at rest.

In the slider 20 of this embodiment, the third surface 33 of the air bearing surface 30 is formed on a surface of the substrate portion 23 that faces toward the recording medium 45. A surface 36 of the insulating portion 24 facing toward the recording medium 45 is located farther from the recording medium 45 than a part of the surface of the substrate portion 23 facing toward the recording medium 45 adjacent to the surface 36, that is, than the third surface 33. The surface 36 constitutes part of the air bearing surface 30. The difference in level between the surface 36 and the third surface 33 is about 3 to 4 nm. This difference in level occurs in the step shown in FIG. 14 or FIG. 27, i.e., the step of forming the surface 33A including the third surface 33 for each slider portion 50, because of a difference in hardness between the substrate portion 23 and the insulating portion 24. In the present embodiment, this difference in level is utilized to reduce the magnetic space.

In the slider 20 of the embodiment, as in the third embodiment, the air bearing surface 30 has a plurality of recesses 35 formed in a region including the border part 34. The slider 20 of the embodiment is otherwise configured the same as in the first or second embodiment.

Now, description will be given of the functions and effects of the slider 20 according to the embodiment. As shown in FIG. 31, the slider 20 of the embodiment makes contact with the surface of the recording medium 45 at the third surface 33 and the border part 34 of the air bearing surface 30 while the recording medium 45 is rotating. In this state, the distance between the surface of the recording medium 45 and the surface 36 of the insulating portion 24 facing toward the recording medium 45 is about 3 to 4 nm. Accordingly, the embodiment can achieve a significant reduction in magnetic space.

According to the embodiment, the surface 36 of the insulating portion 24 facing toward the recording medium 45 makes no contact with the surface of recording medium 45. Therefore, the magnetic space can be reduced significantly as mentioned above while the thin-film magnetic head element 22 is kept away from the surface of the recording medium 45. As a result, it is possible to prevent damage to the thin-film magnetic head element 22 and the recording medium 45 which would be caused by contact between the thin-film magnetic head element 22 and the recording medium 45.

When the recording medium 45 is at rest, the orientation of the slider 20 may be the same as that shown in FIG. 31, or that in FIG. 29 where the slider body 21 is in contact with the surface of the recording medium 45 at the border part 34 of the air bearing surface 30.

The slider 20 of the embodiment achieves a greater reduction in magnetic space as compared with the sliders 20 of the first and second embodiments. Therefore, as compared with the first and second embodiments, the present embodiment provides a greater improvement in the reproducing output and a greater reduction in half width of the reproducing head, as well as greater improvements in the overwrite property and nonlinear transition shift of the recording head. As a result, a greater improvement in the yield of hard disk drives can be achieved.

The remainder of the configuration, functions and effects of the present embodiment are the same as those of the first or second embodiment.

The present invention is not limited to the foregoing embodiments but may be practiced in still other ways. For example, the invention may be applied to a thin-film magnetic head dedicated to reading that has no induction-type electromagnetic transducer, a thin-film magnetic head dedicated to writing that has an induction-type electromagnetic transducer only, or a thin-film magnetic head that performs reading and writing with an induction-type electromagnetic transducer.

As has been described, according to the slider of a thin-film magnetic head of the invention, the medium facing surface has the first surface including a plurality of portions that extend in the direction of air passage, and the second surface including a portion that extends in the direction of air passage, the portion of the second surface being disposed between the plurality of portions of the first surface. The first surface and the second surface have such a difference in level that the second surface is located farther from the recording medium than the first surface is. This difference in level varies gradually so as to increase with decreasing distance from the air outflow end. In this slider, a negative pressure for drawing the slider toward the recording medium occurs between the second surface and the recording medium while the recording medium is rotating. Consequently, according to the invention, the slider can be manufactured easily and the magnetic space can be reduced.

In the slider of a thin-film magnetic head of the invention, the medium facing surface may further have: a third surface that is located closer to the air outflow end than the first surface is; and a border part located between the first surface and the third surface, and the first surface may be slanted against the third surface such that the first and third surfaces altogether make a convex shape bent at the border part. In this case, when the slider body comes into contact with the surface of the recording medium, the border part makes the contact with the surface of the recording medium. Therefore, the invention not only attains a reduction in magnetic space but also prevents the slider from sticking to the recording medium, and prevents damage to the recording medium and the thin-film magnetic head element due to a collision between the slider and the recording medium.

In the slider of a thin-film magnetic head of the invention, the slider body may be in contact with the surface of the recording medium while the recording medium is at rest, and may stay away from the surface of the recording medium while the recording medium is rotating. When the slider body comes into contact with the surface of the recording medium, the border part may be the first to make contact with the surface of the recording medium. In this case, the slider body can smoothly start making contact with the surface of the recording medium. As a result, it is possible to prevent occurrence of damage to the recording medium and the thin-film magnetic head element due to a collision between the slider and the recording medium.

In the slider of a thin-film magnetic head of the invention, the slider body may be in contact with the surface of the recording medium while the recording medium is at rest, and may stay away from the surface of the recording medium while the recording medium is rotating. When the slider body takes off from the surface of the recording medium, the border part may be the last to depart from the surface of the recording medium. In this case, the slider body can smoothly separate from the surface of the recording medium. As a result, it is possible to prevent occurrence of damage to the recording medium and the thin-film magnetic head element due to a collision between the slider and the recording medium.

In the slider of a thin-film magnetic head of the invention, regardless of whether the recording medium is rotating or at rest, the slider body may be in contact with the surface of the recording medium at the border part, and the first surface may slant against the surface of the recording medium such that the smaller the distance between a point in the first surface and the air inflow end, the greater the distance between the point in the first surface and the recording medium. In this case, it is possible to prevent occurrence of a collision between the slider body and the recording medium which would be caused by the slider body coming into contact with and getting away from the surface of the recording medium.

In the slider of a thin-film magnetic head of the invention, the medium facing surface may have a recess formed in a region including the border part. In this case, the area of the slider body contacting the surface of the recording medium can be made smaller. As a result, it is possible to reduce the frictional resistance between the slider body and the surface of the recording medium.

In the slider of a thin-film magnetic head of the invention, the slider body may include: a substrate portion that has a surface facing toward the recording medium and makes a base of the thin-film magnetic head element; and an insulating portion that has a surface facing toward the recording medium and surrounds the thin-film magnetic head element. Here, the surface of the insulating portion facing toward the recording medium may be located farther from the recording medium than a part of the surface of the substrate portion facing toward the recording medium is, the part being adjacent to the surface of the insulating portion facing toward the recording medium. In this case, the third surface of the medium facing surface can be put into contact with the surface of the recording medium to thereby attain a significant reduction in magnetic space.

In the slider of a thin-film magnetic head of the invention, the length of a portion of the third surface in the direction of air passage, the portion belonging to the substrate portion, may be equal to or less than 50% the length of the entire substrate portion in the direction of air passage. In this case, while the recording medium is rotating, the length of the part that approaches the surface of the recording medium out of the entire substrate portion becomes less than or equal to the length of the part that gets away from the surface of the recording medium. Therefore, it is possible to prevent collision between the slider and the recording medium with yet higher reliability.

In the slider of a thin-film magnetic head manufactured by the method of the invention, the medium facing surface has the first surface including a plurality of portions that extend in the direction of air passage, and the second surface including a portion that extends in the direction of air passage, the portion of the second surface being disposed between the plurality of portions of the first surface. The first surface and the second surface have such a difference in level that the second surface is located farther from the recording medium than the first surface is. This difference in level varies gradually so as to increase with decreasing distance from the air outflow end. In this slider, a negative pressure for drawing the slider toward the recording medium occurs between the second surface and the recording medium while the recording medium is rotating. Consequently, according to the invention, the slider can be manufactured easily and the magnetic space can be reduced.

In the method of manufacturing a slider of a thin-film magnetic head of the invention, the medium facing surface may further have: a third surface that is located closer to the air outflow end than the first surface is; and a border part located between the first surface and the third surface, and the first surface may be slanted against the third surface such that the first and third surfaces altogether make a convex shape bent at the border part. In the step of processing the slider material, the slider material may be processed so as to form the medium facing surface on the slider material, the medium facing surface having the first surface, the second surface, the third surface, and the border part. In this case, it becomes possible to not only reduce the magnetic space but also prevent the slider from sticking to the recording medium, and prevent damage to the recording medium and the thin-film magnetic head element due to a collision between the slider and the recording medium.

In the method of manufacturing the slider of the invention, the step of processing the slider material may include the step of forming a recess in the medium facing surface at a region including the border part. In this case, the area of the slider body contacting the surface of the recording medium can be made smaller. As a result, it is possible to reduce the frictional resistance between the slider body and the surface of the recording medium.

In the method of manufacturing a slider of a thin-film magnetic head of the invention, the slider body may include: a substrate portion that has a surface facing toward the recording medium and makes a base of the thin-film magnetic head element; and an insulating portion that has a surface facing toward the recording medium and surrounds the thin-film magnetic head element. Here, the surface of the insulating portion facing toward the recording medium may be located farther from the recording medium than a part of the surface of the substrate portion facing toward the recording medium is, the part being adjacent to the surface of the insulating portion facing toward the recording medium. In this case, the third surface of the medium facing surface can be put into contact with the surface of the recording medium to thereby attain a significant reduction in magnetic space.

In the method of manufacturing a slider of a thin-film magnetic head of the invention, the length of a portion of the third surface in the direction of air passage, the portion belonging to the substrate portion, may be equal to or less than 50% the length of the entire substrate portion in the direction of air passage. In this case, while the recording medium is rotating, the length of the part that approaches the surface of the recording medium out of the entire substrate portion becomes less than or equal to the length of the part that gets away from the surface of the recording medium. Therefore, it is possible to prevent collision between the slider and the recording medium with yet higher reliability.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a slider of a thin-film magnetic head, the slider comprising: a slider body having a medium facing surface that faces toward a rotating recording medium, an air inflow end, and an air outflow end; and a thin-film magnetic head element disposed near the air outflow end and near the medium facing surface of the slider body, the medium facing surface having: a first surface including a plurality of portions that extend in a direction of air passage; and a second surface including a portion that extends in the direction of air passage and that is disposed between the plurality of portions of the first surface, the first surface and the second surface having such a difference in level that the second surface is located farther from the recording medium than the first surface is, the difference in level varying gradually so as to increase with decreasing distance from the air outflow end, the method comprising the steps of:

forming a slider material containing a portion to be the slider body and the thin-film magnetic head element, and processing the slider material so as to form the medium facing surface on the slider material, the medium facing surface having the first surface and the second surface, wherein the slider material has a surface to be the medium facing surface, and the step of processing the slider material includes the steps of:

selectively etching the surface to be the medium facing surface of the slider material to form the second surface; and after selectively etching to form the second surface, lapping the surface to be the medium facing surface of the slider material to form the first surface.

2. A method of manufacturing a slider of a thin-film magnetic head, the slider comprising: a slider body having a medium facing surface that faces toward a rotating recording medium, an air inflow end, and an air outflow end; and a thin-film magnetic head element disposed near the air outflow end and near the medium facing surface of the slider body, the medium facing surface having: a first surface including a plurality of portions that extend in a direction of air passage; and a second surface including a portion that extends in the direction of air passage and that is disposed between the plurality of portions of the first surface, the first surface and the second surface having such a difference in level that the second surface is located farther from the recording medium than the first surface is, the difference in level varying gradually so as to increase with decreasing distance from the air outflow end, the method comprising the steps of:

forming a slider material containing a portion to be the slider body and the thin-film magnetic head element, and processing the slider material so as to form the medium facing surface on the slider material, the medium facing surface having the first surface and the second surface, wherein:

the medium facing surface further has:

a third surface that is located closer to the air outflow end than the first surface is; and a border part located between the first surface and the third surface, the first surface being slanted with respect to the third surface such that the first and third surfaces altogether make a convex shape bent at the border part;

in the step of processing the slider material, the slider material is processed so as to form the medium facing surface on the slider material, the medium facing surface having the first surface, the second surface, the third surface, and the border part;

the slider material has a surface to be the medium facing surface, and the step of processing the slider material includes the steps of:

selectively etching the surface to be the medium facing surface of the slider material to form the second surface;

after the formation of the second surface, lapping the surface to be the medium facing surface of the slider material to form a lapped surface including the third surface; and lapping a part of the lapped surface to form the first surface, the third surface, and the border part.

\* \* \* \* \*